(12) United States Patent
Matsushima

(10) Patent No.: US 7,167,597 B2
(45) Date of Patent: Jan. 23, 2007

(54) IMAGE PROCESSING APPARATUS, IMAGE PROCESSING METHOD, COMPUTER PROGRAM AND STORAGE MEDIUM

(75) Inventor: Yuki Matsushima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 724 days.

(21) Appl. No.: 10/270,065

(22) Filed: Oct. 15, 2002

(65) Prior Publication Data

US 2003/0099407 A1    May 29, 2003

(30) Foreign Application Priority Data

Nov. 29, 2001    (JP) .............................. 2001-363785

(51) Int. Cl.
*G06K 9/40* (2006.01)
*G02F 3/08* (2006.01)
*G06T 5/00* (2006.01)

(52) U.S. Cl. ...................................... 382/274; 358/521

(58) Field of Classification Search ................ 382/169, 382/167, 274, 266, 173, 254; 348/262, 365, 348/229.1, 234, 235, 251; 358/515, 521, 358/522

See application file for complete search history.

(56) References Cited

U.S. PATENT DOCUMENTS

| | | | | |
|---|---|---|---|---|
| 5,278,641 A | * | 1/1994 | Sekizawa et al. | 358/527 |
| 5,289,282 A | * | 2/1994 | Tsuji et al. | 348/624 |
| 5,754,709 A | * | 5/1998 | Moriya et al. | 382/274 |
| 6,101,271 A | * | 8/2000 | Yamashita et al. | 382/167 |
| 6,101,273 A | * | 8/2000 | Matama | 382/169 |
| 6,694,052 B1 | * | 2/2004 | Matama | 382/169 |
| 6,753,910 B1 | * | 6/2004 | Ogata et al. | 348/235 |
| 6,771,815 B1 | * | 8/2004 | Yang et al. | 382/169 |
| 6,809,761 B1 | * | 10/2004 | Tamaru | 348/229.1 |
| 6,873,729 B1 | | 3/2005 | Matsushima | |
| 2003/0020974 A1 | | 1/2003 | Matsushima | |

FOREIGN PATENT DOCUMENTS

| | | |
|---|---|---|
| JP | 7-118786 | 12/1995 |
| JP | 9-37143 | 2/1997 |
| JP | 10-198802 | 7/1998 |
| JP | 11-154235 | 6/1999 |
| JP | 2000-134467 | 5/2000 |

* cited by examiner

*Primary Examiner*—Kanjibhai Patel
(74) *Attorney, Agent, or Firm*—Oblon, Spivak, McClelland, Maier & Neustadt, P.C.

(57) ABSTRACT

An image processing apparatus includes a determination part, an information obtaining part, a dynamic range setting part and a processing part. The determination part determines whether or not an image includes an area where destruction of gradation due to contrast correction tends to be conspicuous. The information obtaining part obtains information of the area when the determination part determines that the image includes such an area. The dynamic range setting part sets a dynamic range using the information obtained by the information obtaining part. The processing part performs the contrast correction on the image using the dynamic range set by the dynamic range setting part.

18 Claims, 22 Drawing Sheets

FIG.15
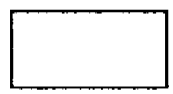 TARGET AREA

IMAGE PROCESSING APPARATUS, IMAGE PROCESSING METHOD, COMPUTER PROGRAM AND STORAGE MEDIUM

BACKGROUND OF THE INVENTION

1. Field of the Invention

The present invention generally relates to image correction processes, and more particularly to a contrast correction process and a gradation correction process of a digital image.

2. Description of the Related Art

A digital camera is equipped with an automatic exposure control mechanism for constantly maintaining an optimum exposure when photographing. There are various kinds of exposure control methods. However, generally, the aperture and shutter speed are adjusted by dividing a screen into a plurality of appropriate areas for detecting the light volume, and weighting each of the areas so as to obtain a weighted average of the light volume.

Generally, as scenes for photographing by a digital camera, the following are conceivable.

normal photographing: outdoor photographing without backlight and general photographing
  backlit scene: photographing in a state where a light source exists behind an object
  night portrait photographing: photographing using flash at night
  night view photographing: photographing of a self-luminous object such as an illumination source In addition, exposure states include a "correct" state in which the exposure of an object is correct and an "underexposed" state in which the exposure of an object is deficient.

Each manufacturer employs an exposure control system for digital cameras. However, no perfect system exists since the exposure control system sometimes does not operate correctly depending on photographing conditions. As a result, contrast shortfalls and underexposure occur frequently.

In order to prevent an inappropriate contrast state when photographing to produce a digital image, Japanese Laid-Open Patent Application No. 10-198802 proposes a technique. That is, the luminance distribution is obtained for every pixel in image data. Thereafter, a dynamic range (a shadow point and a highlight point) is set by regarding a point obtained by subtracting a predetermined distribution ratio from the highest value of the luminance distribution as an upper limit, and a point obtained by adding the predetermined distribution ratio to the lowest value of the luminance distribution as a lower limit. Then, contrast correction is performed. Additionally, in order to perform correction corresponding to a scene, another technique is proposed in Japanese Laid-Open Patent Application No. 11-154235. In the technique, the scene of an image is analyzed by using a neural network, a density zone that is considered to be abnormal is eliminated from a luminance histogram, and the rest is regarded as an effective density zone. Then, reference density values (a shadow point and a highlight point) are calculated from the effective density zone.

The automatic exposure control mechanism of the digital camera controls the exposure in accordance with the brightness of the background, especially in a backlit scene. Thus, an object comes out dark. In addition, in night portrait photographing, the aperture and the shutter speed are fixed to respective predetermined values on the assumption that a strobe light illuminates the object. However, when the distance between the strobe light and the object is too great, the strobe light does not reach the object. The object comes out dark also in this case.

In order to correspond to such an incorrect exposure state in photographing to produce a digital image, techniques of automatically performing the gradation correction on the image data have been proposed. For example, Japanese Laid-Open Patent Application No. 2000-134467 proposes a technique that estimates whether an original image is a backlit image, a night strobe image or a normal exposure image from the shape of a luminance histogram, and performs a process according to the state. Additionally, Japanese Laid-Open Patent Application No. 09-037143 proposes a technique that recognizes a photographing condition (from backlight to excessive follow light) from photometric values of an object and a background so as to adjust the exposure. Further, Japanese Patent Publication No. 07-118786 proposes a technique of comparing an output signal of a center part of an imaged screen and that of a peripheral part, and continuously increasing the gain as the output of the peripheral part increases, or outputs a control signal that maintains the gain to be constant.

It should be noted that the exposure correction refers to adjusting the brightness of an object having inappropriate brightness with respect to a scene to a brightness suitable for the scene. For example, brightening an object that is entirely dark due to underexposure or an object that is dark due to backlight, or darkening an overexposed object. Generally, the exposure correction in the camera is performed by varying the aperture and the shutter speed so as to adjust the amount of incoming light that enters into a lens. Further, in printers and displays, the exposure correction refers to a process of optimizing the brightness of output signals with respect to that of input signals, by using an input/output conversion function (a linear or nonlinear gradation correction table). Adjusting the brightness of image data by correcting the exposure as mentioned above and the gradation correction process according to the present invention have the same object. Thus, in the following, both will be described as the gradation correction process.

In an image where the distribution of luminance is extremely skewed and no object exists other than a person, such as a portrait image photographed at night (hereinafter referred to as a "night portrait image"), when the dynamic range is set for the whole image as proposed in the Japanese Laid-Open Patent Application No. 10-198802, in a case where the object is small, the highlight point is set in the vicinity of the brightness that the object has. As a result, the gradation is destructed or deteriorated due to over-correction. With human visual acuity, the destruction of the gradation or the deterioration of the gradation is conspicuous in a highlight area having little color. Accordingly, color information is ignored when the highlight point is determined based only on the luminance histogram. Thus, the destruction of the gradation and hue variation may occur in an area having the above-mentioned characteristics.

Additionally, in the Japanese Laid-Open Patent Application No. 11-154235, the highlight point is calculated from the effective density area obtained by eliminating an abnormal area from a density histogram according to the scene. However, as in the Japanese Laid-Open Patent Application No. 10-198802, when the highlight area in which the destruction of the gradation stands out is small, the destruction of the gradation occurs with the correction.

SUMMARY OF THE INVENTION

Accordingly, a general object of the present invention is to provide an improved and useful image processing apparatus, image processing method, computer program, and a computer-readable storage medium in which the above-mentioned problems are eliminated.

A more specific object of the present invention is to provide an image processing apparatus, image processing method, computer program, and computer-readable recording medium containing the computer program for performing correct contrast correction that does not cause the destruction of gradation or the deterioration of the gradation and hue variation on an image that is-photographed in a state where destruction of gradation and hue variation are likely to be caused in the conventional technique, such as a backlit image with overrange and a night portrait image in which an object exists on a highlight side.

Further, in the gradation correction process, what is important is to determine a scene accurately and to set a correction parameter in accordance with the scene. In a case of a digital image, as in the Japanese Laid-Open Patent Application No. 2000-134467, generally, a luminance histogram peculiar to the digital image is obtained, and a scene is recognized by the shape, highlight and shadow point of the luminance histogram. In addition, exposure determination is made from a statistic such as a median. However, when an image is categorized into a scene, a correction process thereafter depends on the scene. Accordingly, an error process is performed when the accuracy of the scene determination is low. Further, it is difficult to determine the exposure state from a histogram lacking position information. Especially, there is a possibility that a correct determination cannot be made when an image is peculiar.

For example, when the exposure determination is made by using a histogram for an image of a person with a dark color wall as the background with correct exposure, the image is determined to be underexposed since the image is entirely dark though the object is appropriately exposed. As a result, over-correction is performed on the image. Additionally, in a complete backlit state where a light source exists right behind an object, the background is overranged. Thus, as in the Japanese Laid-Open Patent Application No. 09-037143 and Japanese Patent Publication No. 07-118786, it is possible to more accurately determine whether an image is in the complete backlight state or not by using color information of the background than by using contrast information of the background and the object.

Accordingly, another object of the present invention is to provide an image processing apparatus for recognizing a condition under which an image is photographed not by categorizing the image into a scene but based on the absolute brightness of the background or the relative relationship between the brightness of an object and that of the background, and for performing appropriate gradation correction on images photographed under various conditions.

In order to achieve the above-mentioned objects, according to one aspect of the present invention, there is provided an image processing apparatus including: a determination part that determines whether or not an image includes an area where destruction of gradation due to contrast correction tends to be conspicuous; an information obtaining part that obtains information of the area when the determination part determines that the image include the area; a dynamic range setting part that sets a dynamic range using the information obtained by the information obtaining part; and a processing part that performs the contrast correction on the image using the dynamic range set by the dynamic range setting part.

Additionally, according to another aspect of the present invention, there is provided an image processing method including the steps of: (a) determining whether or not an image includes an area where destruction of gradation due to contrast correction tends to be conspicuous; (b) obtaining information of the area when it is determined, in the step (a), that the image includes the area where the destruction of gradation due to the contrast correction tends to be conspicuous; (c) setting a dynamic range using the information of the area obtained in the step (b); and (d) performing the contrast correction on the image using the dynamic range set in the step (c).

In addition, according to another aspect of the present invention, there is provided an image processing apparatus including: a first determination part that determines whether or not an image is a backlit image by using color information of a background area of the image; a second determination part that determines a relative contrast relationship between the background area and an object area of the image; and a processing part that performs an adaptive gradation correction on the image according to a first determination result of the first determination part and a second determination result of the second determination part.

It should be noted that the relative contrast relationship refers to whether or not one is brighter than the other between the background area and the object area.

Further, according to another aspect of the present invention, there is provided an image processing method including the steps of: (a) determining whether or not an image is a backlit image by using color information of a background area of the image; (b) determining a relative contrast relationship between the background area and an object area of the image; and (c) performing an adaptive gradation correction on the image according to a first determination result of the step (a) and a second determination result of the step (b).

Additionally, according to another aspect of the present invention, there is provided a computer program for causing a computer to carry out an imaging process including the procedures of: (a) causing the computer to determine whether or not an image includes an area where destruction of gradation due to contrast correction tends to be conspicuous; (b) causing the computer to obtain information of the area when it is determined, in the procedure (a), that the image includes the area where destruction of gradation due to contrast correction tends to be conspicuous; (c) causing the computer to set a dynamic range using the information obtained in the procedure (b); and (d) causing the computer to perform the contrast correction on the image using the dynamic range set in the procedure (c).

Furthermore, according to another aspect of the present invention, there is provided a computer program for causing a computer to carry out an imaging process including the procedures of: (a) causing the computer to determine whether or not an image is a backlit image by using color information of a background area of the image; (b) causing the computer to determine a relative contrast relationship between the background area and an object area of the image; and (c) causing the computer to perform an adaptive gradation correction on the image according to a determination result of the procedure (a) and a determination result of the procedure (b).

Additionally, according to another aspect of the present invention, there is provided a computer-readable storage medium that stores a program for causing a computer to carry out an imaging process including the procedures of: (a) causing the computer to determine whether or not an image includes an area where destruction of gradation due to contrast correction tends to be conspicuous; (b) causing the computer to obtain information of the area when it is determined, in the procedure (a), that the image includes the area where destruction of gradation due to contrast correction tends to be conspicuous; (c) causing the computer to set a dynamic range using the information obtained in the procedure (b); and (d) causing the computer to perform the contrast correction on the image using the dynamic range set in the procedure (c).

Further, according to another aspect of the present invention, there is provided a computer-readable storage medium that stores a program for causing a computer to carry out an imaging process including the procedures of: (a) causing the computer to determine whether or not an image is a backlit image by using color information of a background area of the image; (b) causing the computer to determine a relative contrast relationship between the background area and an object area of the image; and (c) causing the computer to perform an adaptive gradation correction on the image according to a first determination result of the procedure (a) and a second determination result of the procedure (b).

According to the present invention, the dynamic range is set by using the information of the area where the destruction of the gradation due to the contrast correction tends to be conspicuous. Hence, it is possible to perform correct contrast correction that does not cause the destruction of the gradation on images such as a backlit image with overrange, a night portrait image in which an object exists on a highlight side, and the like. Especially, by using the color information for setting the highlight point, it is possible to perform correct contrast correction that does not cause the destruction of the gradation or hue variation.

In addition, according to the present invention, the gradation correction is performed not by categorizing an image into scenes, but by recognizing the photographing condition based on the absolute brightness of a background or on the relative relationship between the brightness of an object and that of the background. Thus, it is possible to perform correct gradation correction on images photographed under various photographing conditions, such as a backlit image, a night portrait image, and a night scene image. Further, determination of the backlit image can be performed with good accuracy. Hence, it is possible to positively perform correct gradation correction on the backlit image. At the same time, it is possible to avoid incorrect gradation correction due to erroneous determination of the backlit image.

Other objects, features and advantages of the present invention will become more apparent from the following detailed description when read in conjunction with the following drawings.

BRIEF DESCRIPTION OF THE DRAWINGS

FIG. 15 is an image showing a target area in the, portrait image in FIG. 4;

DETAILED DESCRIPTION OF THE PREFERRED EMBODIMENTS

Figure 1:
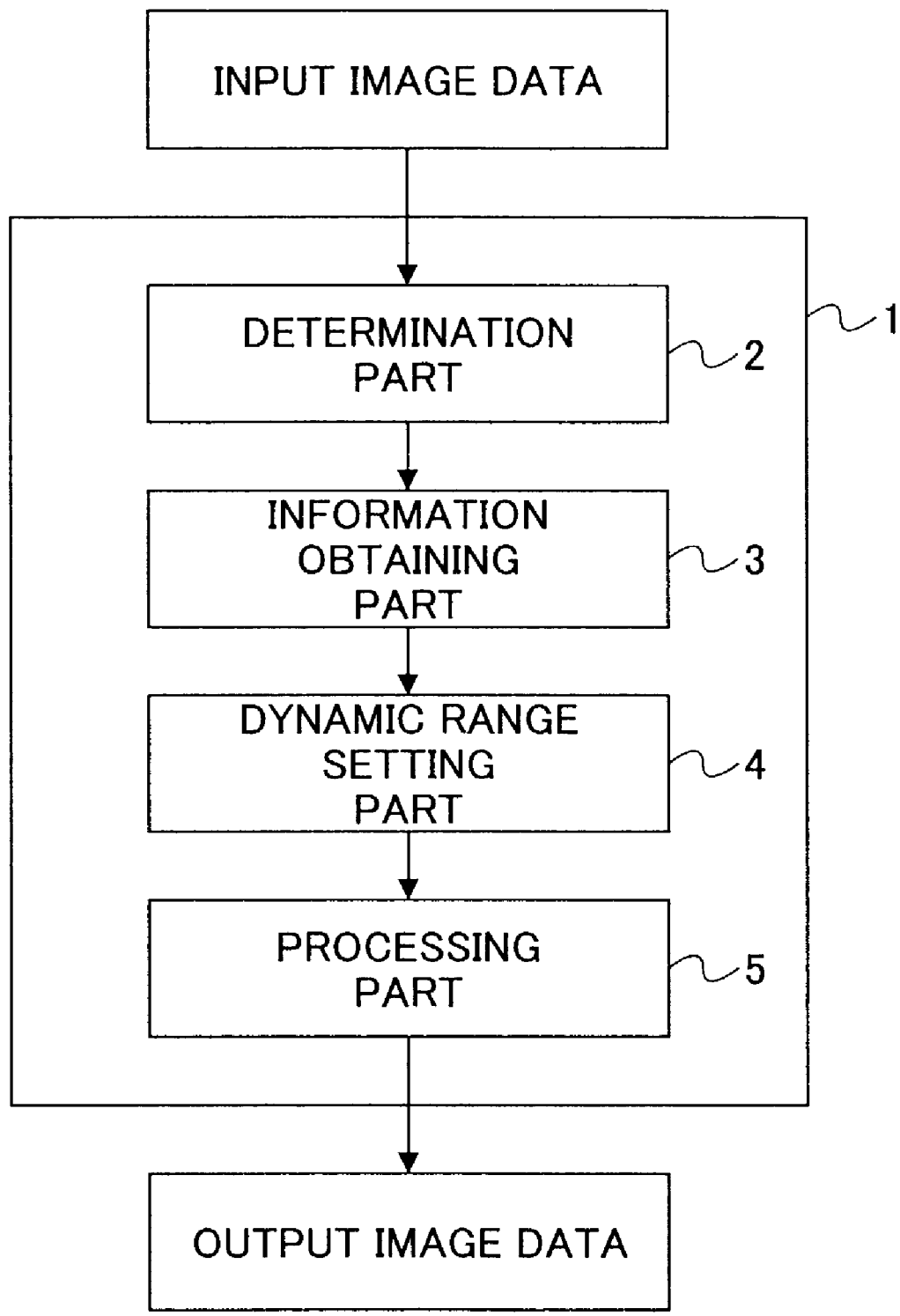
FIG. 1 is a block diagram showing the structure of a first embodiment.

In the following, a detailed description will be given of embodiments of the present invention, by referring to the drawings.

<First Embodiment>

Figure 2:
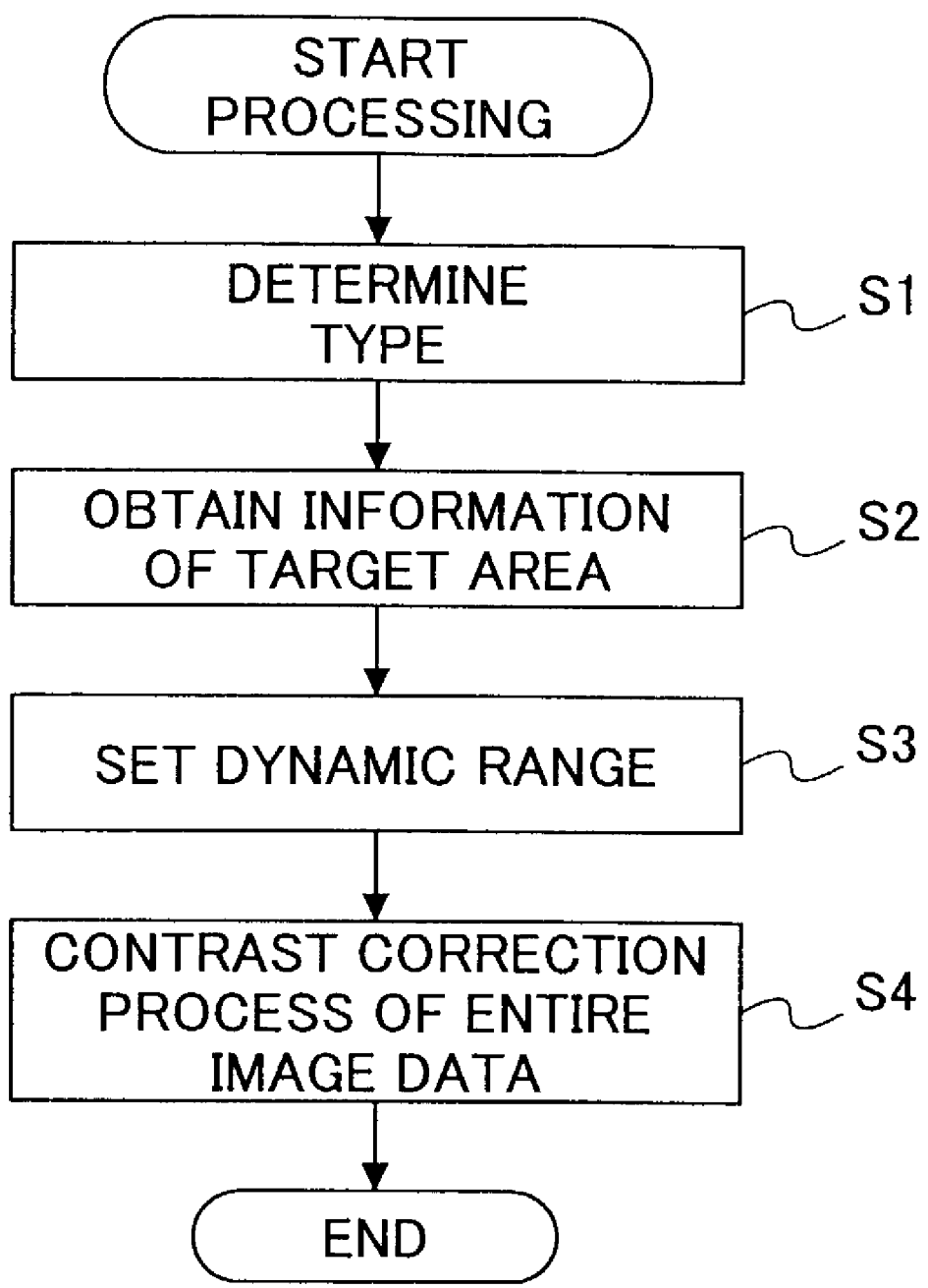
FIG. 2 is a flow chart for explaining the procedure of a second embodiment.

FIG. 1 is a block diagram showing the structure of an image processing apparatus 1 according to a first embodiment of the present invention. FIG. 2 is a flow chart for explaining the procedure of the first embodiment.

The image processing apparatus 1 in FIG. 1 includes a determination part 2, an information obtaining part 3, a dynamic range setting part 4, and a processing part 5. The image processing apparatus 1 performs contrast correction of image data. The determination part 2 performs a type determination process of step S1 in FIG. 2 on an input image. The information obtaining part 3 performs the process of step S2 in FIG. 2, that is, the process of obtaining information of a target area for setting a highlight point in accordance with the determined type. The dynamic range setting part 4 performs the process of step S3 in FIG. 2, that is, the process of setting a dynamic range using the obtained information of the target area. The processing part 5 performs a contrast correction process of step S4 in FIG. 2 on the entire image using the dynamic range that is set. Hereinafter, a detailed description will be given of each of the above-mentioned parts. In addition, the input image data are handled as RGB data. However, it will be clear from the following description that color image data of other formats can be processed in a similar manner.

First, a description will be given of the determination part 2 that performs the process of step S1. The determination part 2 determines whether or not an image is categorized into type A or type B. The type A refers to an image including an area where destruction of the gradation or deterioration of the gradation tends to stand out by performing the contrast correction. The type B refers to an image that does not include such an area. The "area where destruction of the gradation tends to stand out" is an important area in structuring an image.

Figure 3:
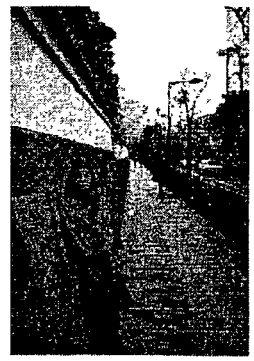
FIG. 3 is a photograph showing an example of a backlit scene image.
Figure 4:
FIG. 4 is an image showing an example of a portrait image photographed at night.
Figure 5:
FIG. 5 is an image showing an example of an image photographed normally.

An image photographed against light, a portrait image photographed at night and the like are determined as the type A, for example. When a background is overranged due to a backlit scene, the destruction of the gradation tends to stand out in a highlight part other than the background. Additionally, also in the portrait image photographed at night, an object exists on a highlight side. Thus, when a process that excessively emphasizes the contrast is performed on the portrait image, the destruction of the gradation stands out. Further, an image is determined as the type A when the brightness of an object exists in a relatively bright area of the image. FIGS. 3 and 4 show examples of the type A images. Images that are not determined as the type A are determined as the type B. For example, an appropriately exposed image photographed normally, an underexposed image and the like are determined as the type B. FIG. 5 shows an example of the type B.

Figure 6:
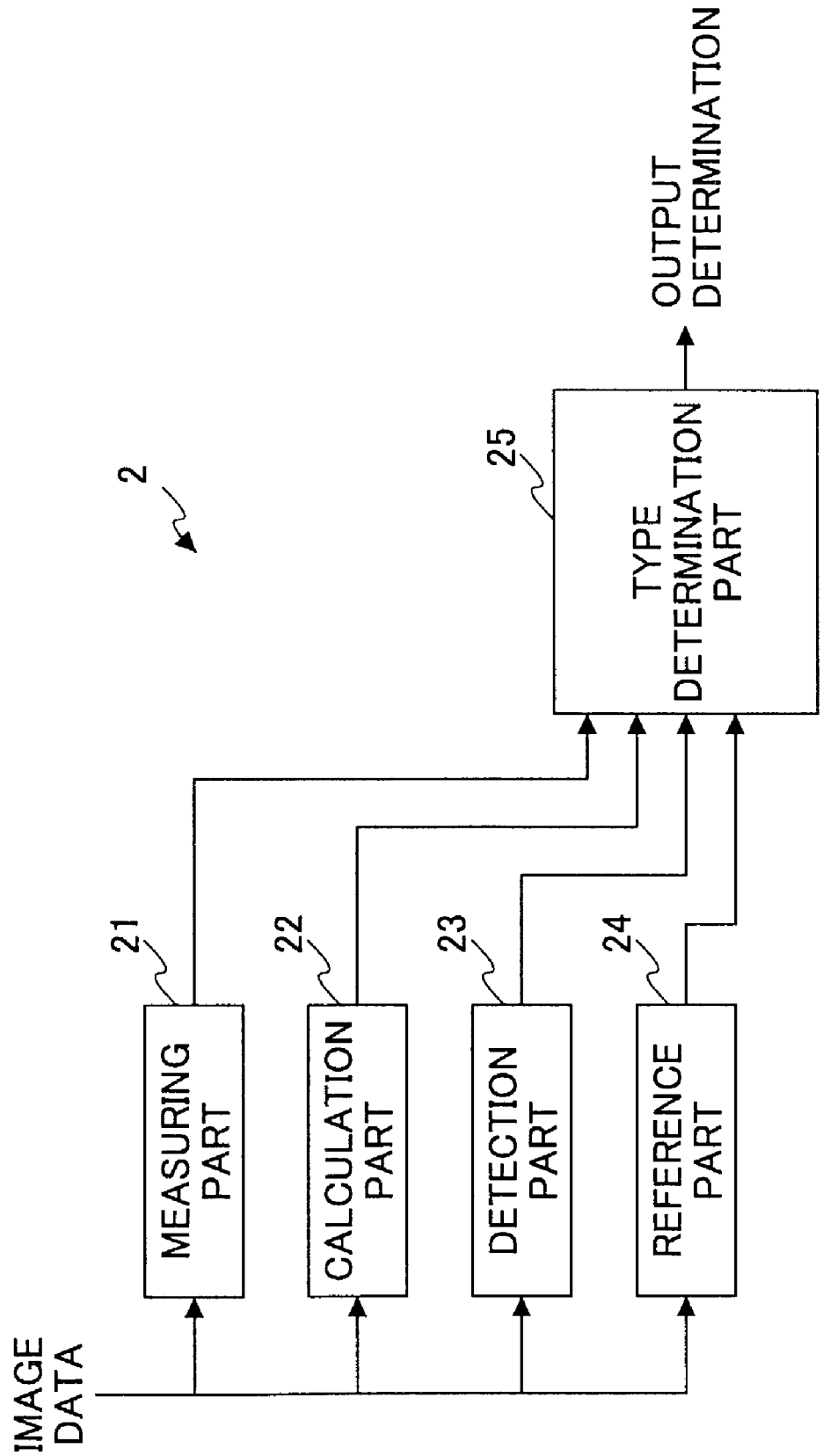
FIG. 6 is a block diagram showing the structure of a determination part in FIG. 1.
Figure 7:
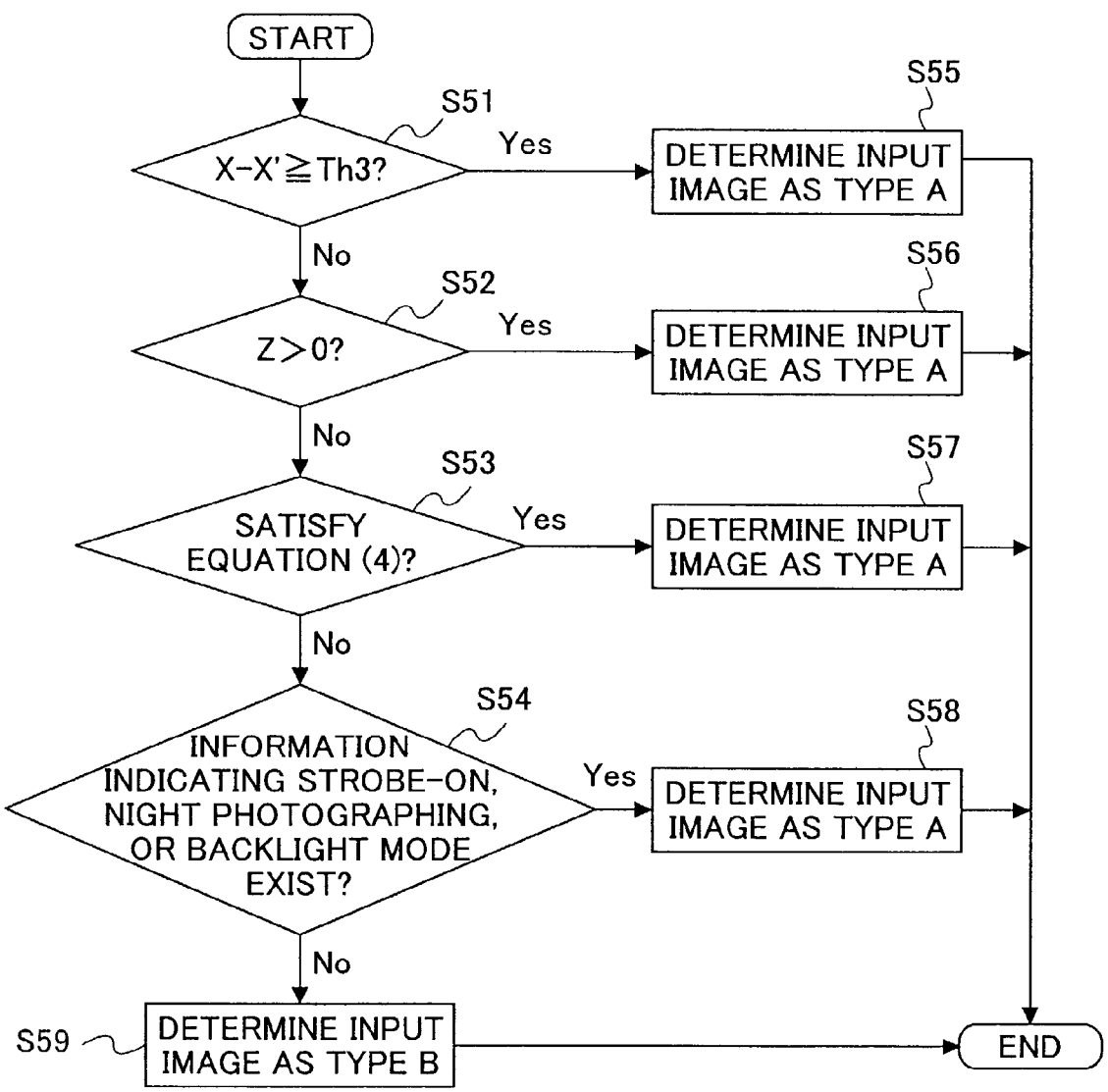
FIG. 7 is a flow chart for explaining the type determination procedure of a type determination part in FIG. 6.

FIG. 6 shows an example of the structure of the determination part 2. The determination part 2 in FIG. 6 includes a measuring part 21, a calculation part 22, a detection part 23, a reference part 24 and a type determination part 25. In many cases, a luminance histogram of a type A image has unbalanced distribution. The measuring part 21, calculation part 22 and detection part 23 are provided for obtaining the characteristics of such a luminance histogram. It is often the case that image data contain information of photographing as header information or the like. For example, in a case where image data photographed by a digital camera are stored in an information form such as Exif and the like, it is possible to embed information of photographing into a tag. The reference part 24 obtains information (specifically, mode information such as backlight mode and night photographing mode, ON/OFF information of a strobe, and the like) that is contained in such image data and is usable for determining the type. The type determination part 25 finally determines the type of an image based on the information obtained by each of the above-mentioned parts 21 through 24. FIG. 7 shows the determination flow of the determination part 25.

Figure 8:
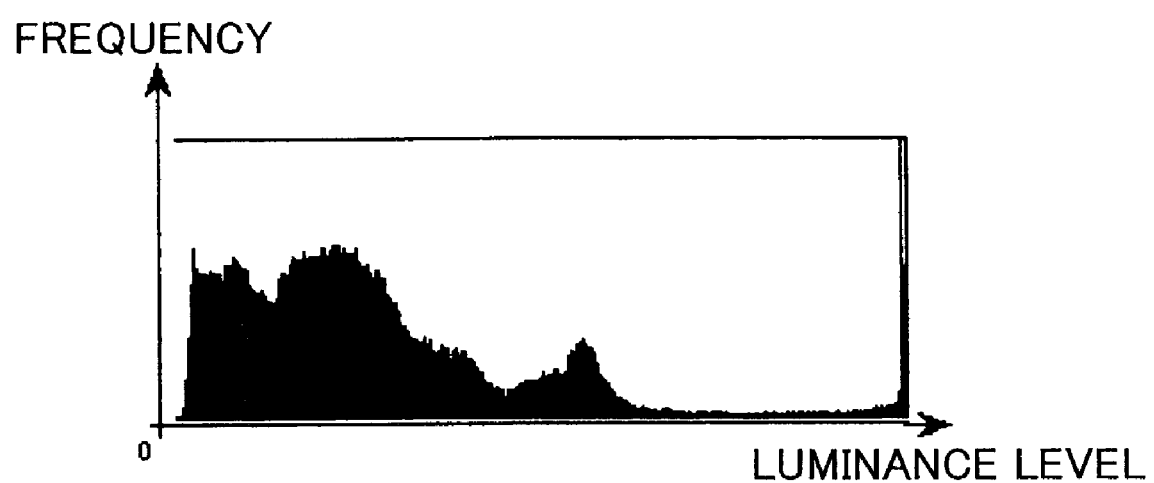
FIG. 8 is a diagram showing an example of the luminance histogram of a backlit scene image.
Figure 9:
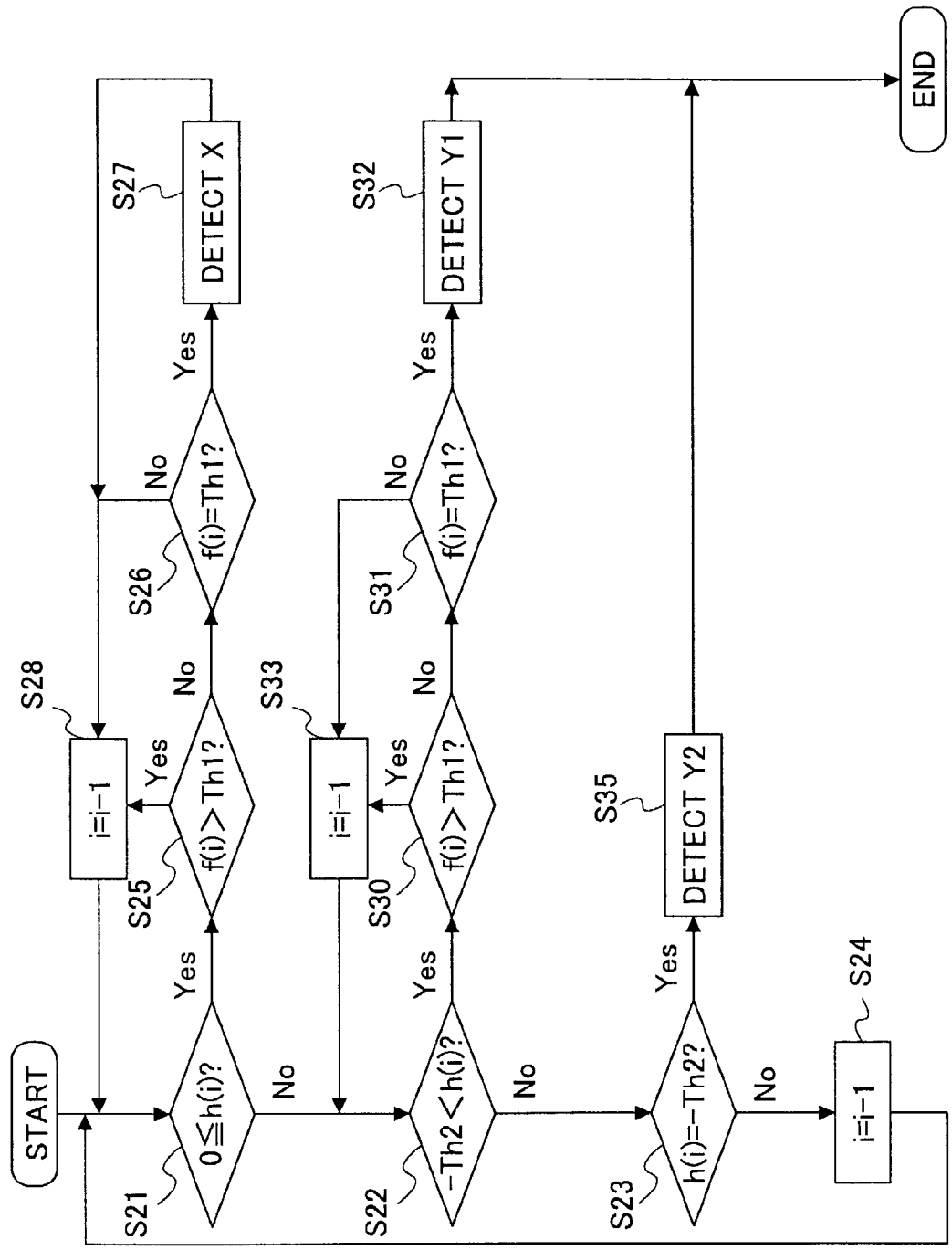
FIG. 9 is a flow chart for explaining the procedure of measuring polarization in the luminance histogram.
Figure 10:
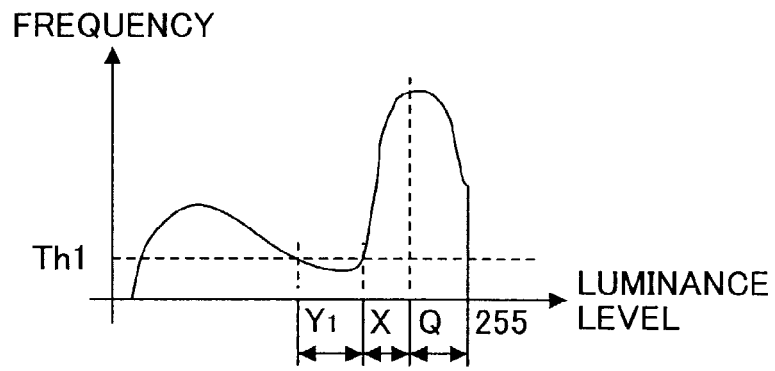
FIG. 10 is an explanatory diagram of measurement of the polarization when the luminance histogram does not have two poles.
Figure 11:
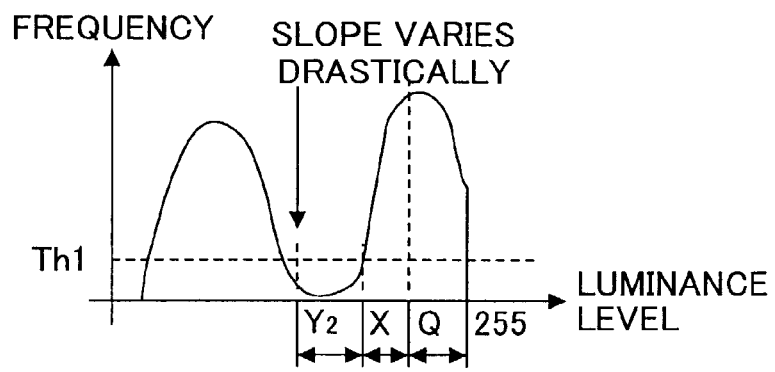
FIG. 11 is another explanatory diagram of the measurement of the polarization when the luminance histogram has two poles.

First, a description will be given of the measuring part 21. As described above, in many cases, the histogram of the image determined as the type A has unbalanced distribution. Especially, in an image photographed against light, it is often the case that an object is extremely dark and the background is extremely bright. In such a case, the luminance histogram is polarized as shown in FIG. 8. The measuring part 21 measures the polarization level of the luminance histogram using the frequency and slope of the luminance histogram. FIG. 9 shows the process flow of the measuring part 21. FIGS. 10 and 11 are diagrams for explaining a polarized luminance histogram and a non-polarized luminance histogram, respectively.

Here the slope h(i) is represented as:

$$h(i)=(f(i+\delta)-f(i))/\delta \quad (1)$$

$(i=0, 1, 2, \ldots 255-\delta, \delta>0)$ where the luminance level of the luminance histogram is i ($i=0, 1, 2, \ldots 255$), and the frequency of the level i is f(i).

The measuring of the polarization is performed such that each luminance level of X and Y1 or Y2 is detected while decrementing the luminance level from 255-.

A description will be given of a process in a case where the luminance histogram does not have two poles, by referring to FIG. 10. In a luminance level area of $255 \geq i \geq Q$ where the slope h(i) is negative, only a loop of steps S21 through S24 in FIG. 9 are repeated and the i is decremented. In another luminance level area of $Q>i>X$ where the slope h(i) is positive and the frequency f(i) is greater than a threshold value Th1, only a loop of steps S21, S25 and S28 in FIG. 9 is repeated and the i is decremented. However, when f(i)=Th1 (YES in step S26 in FIG. 9), the i is detected as a luminance level X in step S27, and the process proceeds to step S28. Thereafter, in another luminance level area of $X>i>Y1$ where the slope is gentle and the frequency is low, a loop of steps S21, S25, S26 and S28 or a loop of steps S22, S30, S31 and S33 is repeated and the i is decremented. However, when f(i)=Th1 (YES in step S31 in FIG. 9), the i is detected as a luminance level Y1 in step S32, and the process ends.

A description will be given of a process in a case where the luminance histogram has two poles, by referring to FIG. 11. Also in this case, the same process is performed as that of the case shown in FIG. 10 until the level X is detected. However, in the case where the luminance histogram has two poles, the slope h(i) sharply increases in a negative direction in an area where the frequency f(i) is less than the threshold value Th1. When h(i)=Th2 (Th2 is a threshold value)(Yes in step S23 in FIG. 9), the i is detected as a luminance level Y2 in step S35, and the process ends.

In should be noted that the degree of polarization to be detected varies according to settings of Th1 and Th2. For example, Th1 and Th2 may be determined by the following equations where N represents a total frequency count of the luminance histogram.

$$Th1=C*N$$

$$Th2=f(i)*D (\text{C and D are constants}) \quad (2)$$

The type determination part 25 regards the greater one of the luminance levels Y1 and Y2 that are detected by the measuring part 21 as a luminance level X', compares the difference (X−X') between the luminance level X and luminance level X' and a threshold value Th3 (step S51 in FIG. 7), determines that the luminance histogram has two poles when $X-X' \geq Th3$, and decides the type of the input image as the type A in step S55 in FIG. 7.

Next, a description will be given of the calculation part 22. In a portrait image photographed at night with a flash, since the background is the darkness, the frequencies of the luminance levels are distributed extremely skewed in an area where the luminance levels are low. On the other hand, in a correctly exposed image that is normally photographed and represents the type B, the luminance histogram is not skewed and has a well-balanced distribution. As a measure for representing the skew of the luminance histogram, the calculation part 22 calculates the degree of distortion Z of the luminance histogram by the following formula.

$$Z=(1/N)\Sigma((Y(j)/ave(Y(j))/S(Y(j)))^3 \quad (3)$$

It should be noted that N is a total number of pixels, Y(j) is a luminance of the "j"th pixel, and the sum Σ is obtained from j=1 through N. In addition, ave(Y(j)) is an average value of Y(j), and S(Y(j)) is a standard deviation of Y(j).

Figure 12:
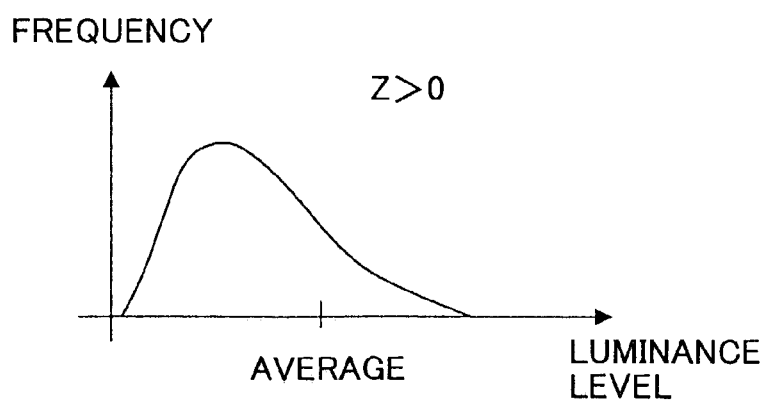
FIG. 12 is a diagram showing an example of the luminance histogram in which a degree of distortion Z is greater than zero.

When Z>0, the luminance histogram is in a shape having the peak at a low luminance level as shown in FIG. 12. Accordingly, the type determination part 25 of the determination part 2 determines whether or not the calculated degree of distortion is greater than 0 in step S52 in FIG. 7. When the condition Z>0 is satisfied, the type of the input image is determined as the type A in step S56 in FIG. 7. Further, the input image may be determined as the type A when a threshold value other than 0 is set and the degree of distortion Z is greater than the threshold value.

Additionally, in a case where, in an image, the brightness of a background area is extremely different from that of an object area, it is conceived that the distribution of the luminance histogram is not well balanced. Consequently, the detection part 23 of the determination part 2 distinguishes a background area from an object area in an input image and detects the brightness of each of the areas. As a measure of the brightness of each of the areas, for example, a luminance median or a luminance average value may be used. Then, the type determination part 25 of the determination part 2 performs condition determination of the following formula (4) in step S53 in FIG. 7. When the condition is satisfied, the type of the input image is determined as the type A in step S57 in FIG. 7.

brightness of background<<brightness of object or brightness of background>>brightness of object (4)

More specifically, according to this condition determination, for example, in a case where luminance average value of background/luminance average value of object>$Th4$ or luminance median of background/luminance median of object>$Th5$ is satisfied, the input image may be determined as the type A (an image photographed against light). In addition, in a case where luminance average value of background/luminance average value of object<$Th4$ or luminance median of background/luminance median of object<$Th5$ is satisfied, the input image may be determined as the type A (a portrait image photographed at night).

Further, as described above, when image data are attached with information from which photographing conditions can be recognized, the type of the image can be determined according to the information. It is a role of the reference part 24 of the determination part 2 to refer to such attached information. More specifically, the reference part 24 refers to information indicating specific photographing conditions corresponding to the type A such as backlight-mode photographing, night photographing mode and strobe-ON. When there is information indicating such specific photographing conditions (YES in step S54 in FIG. 7), the type of the input image is determined as the type A in step S58 in FIG. 7. On the other hand, when none of the conditions of steps S51 through S54 is satisfied, the type determination part 25 determines the type of the input image as the type B in step S59 in FIG. 7.

Further, an operator may give the information indicating the specific photographing conditions such as backlight-mode photographing, night photographing mode and strobe-ON, and the present invention includes such a configuration. Additionally, other information, for example, information of a shutter speed may be used (when the shutter speed is slow, there is a high possibility that photographing is performed in a state other than a correct exposure. Thus, the type of an image may be determined as the type A).

The determination in steps S51 and S52 is based on the shape of the luminance histogram. However, thinning of the luminance histogram may be performed in the determination.

Furthermore, other than the shape of the luminance histogram, the highlight point may be used for the type determination. In this case, the highlight point may be obtained by accumulating the frequency from the luminance level 255, and regarding the luminance level at which the cumulative frequency exceeds, for example, 0.5% of the total frequency as the highlight point. In other words, the total frequency N may be given by $N=\Sigma z(i)$ (the sum is obtained where i=0, 1, 2 ... 255)

where the frequency of a luminance level i is z(i) (i=0, 1, 2 ... 255). The highlight point may be the maximum value of i that satisfies $(0.5*N)/100 \leq \Sigma z(i)$ (i=255, 254, ... )

The determination method of the determination part 2 is not limited to the above-mentioned methods. Other methods may be employed as long as the methods can determine whether or not an area exists where the destruction of the gradation tends to stand out due to the contrast correction.

Next, a description will be given of the information obtaining part 3 that performs step S2 in FIG. 2. The information obtaining part 3 obtains information of an area (target area) for setting the highlight point, according to the type determined by the determination part 2. In the following, a description will be given separately of a case of the type A and a case of the type B.

Figure 13:
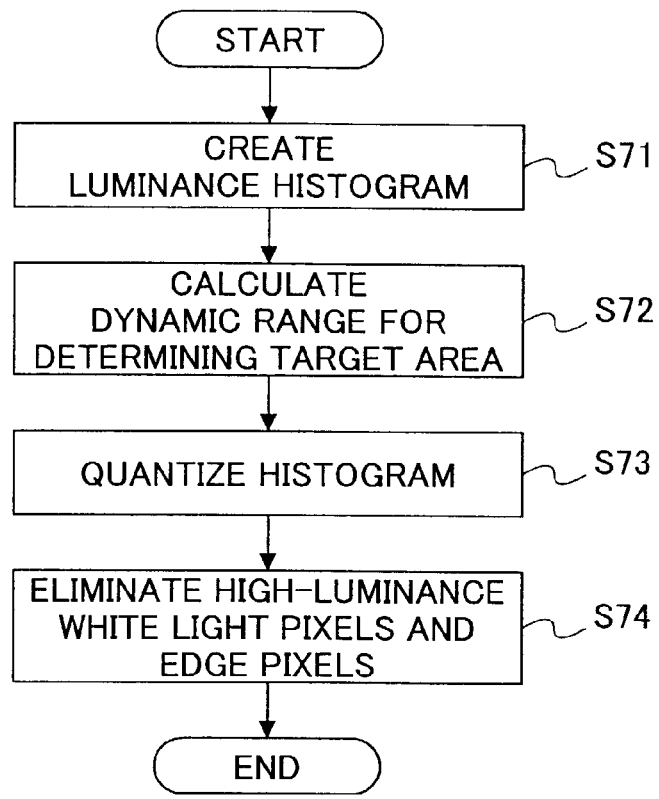
FIG. 13 is a flow chart for explaining the process of an information obtaining part in FIG. 1 for a type A image.

First, a description will be given of the case where an input image is determined as the type A. In this case, an area where the destruction of the gradation tends to stand out is regarded as the target area. Such an area is a highlighted area that is faintly colored, that is, an image area corresponding to a "relatively bright" area when an image is expressed by information indicating the distribution of the brightness. FIG. 13 shows a process flow performed by the information obtaining part 3 for obtaining such area. In the following, a description will be given of each step of the process flow.

Step S71 creates a luminance histogram of an entire input image. It should be noted that the luminance histogram made by the determination part 2 may be used.

Step S72 calculates a dynamic range (Scene_Min, Scene_Max) for determining the target area, in order to extract a relatively bright part from the image. That is, in the luminance histogram, step S72 accumulates frequencies from the minimum luminance level to the maximum luminance level and from the maximum luminance level to the minimum luminance level, and determines the luminance levels at which the cumulative frequencies comprise 1% of the total frequencies as a shadow point Scene_Min and a highlight point Scene_Max, respectively. However, this set parameter (cumulative frequencies 1%) is an example and may be varied. Further, as for images photographed by a digital camera, noise tends to appear at luminance level 0 and luminance level 255. Thus, generally, it is preferable to set the minimum luminance level to 1 and the maximum luminance level to 254.

Figure 14:
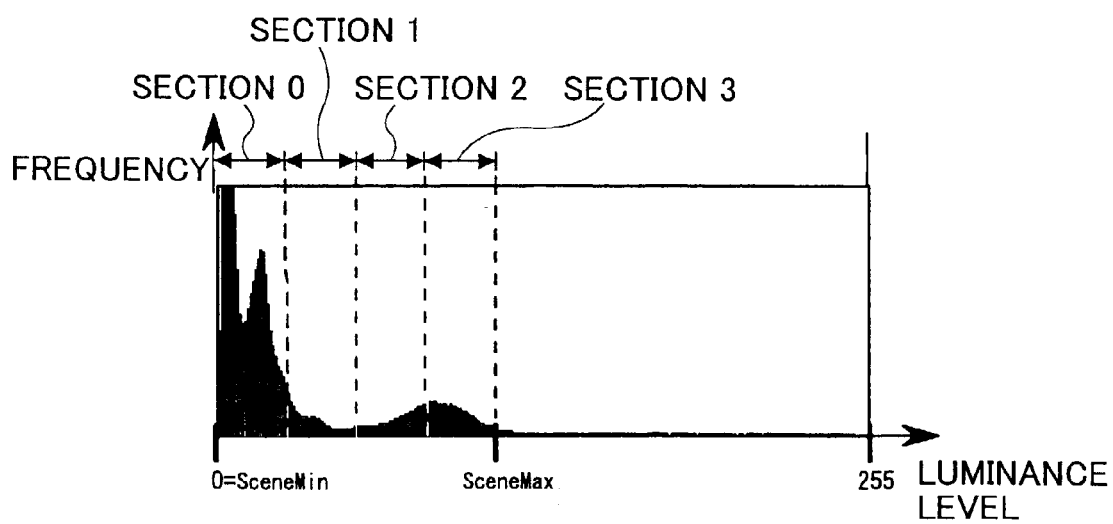
FIG. 14 is an explanatory diagram of quantization of the luminance histogram.

Step S73 quantizes the luminance histogram into several sections so as to determine the relatively bright part in the image from an area of distribution of the luminance histogram. For example, the interval between the Scene_Min and Scene_Max is divided into four sections. Then, a number is assigned for each of the sections in ascending order of the luminance level. FIG. 14 shows an example of the quantization. Pixels belonging to a section 3 having the highest luminance level correspond to the "relatively bright area".

Step S74 eliminates high-luminance white light pixels and edge pixels from the "relatively bright area" that is obtained by the above-mentioned steps, and sets the remaining pixels to the target area.

In the portrait image photographed at night shown in FIG. 4, the target area is an overranged area shown in FIG. 15. The reason for eliminating the area of the high-luminance white light pixels beforehand is that, in the area, even if the gradation is destructed due to the contrast correction (which will be described later), it is difficult to recognize the distortion (the distortion does not stand out). In addition, the reason for eliminating the area of the edge pixels beforehand is that the area thereof is not suitable for the determination since there is a possibility that the edge pixels are intentionally emphasized by the edge emphasizing process in the digital camera.

It should be noted that the high-luminance white color pixels refer to areas that satisfy, for example, $$((R>240 \&\& G>240 \&\& B>240) \&\& (|G-R|<10 \&\& |G-B|<10)) \quad (5).$$

where R, G and B are the color components.

Next, a description will be given of an input image determined as the type B. Since the type B image has a moderate contrast and a luminance histogram thereof has a well-balanced distribution in a wide area, it is possible to use the entire image for setting the highlight point. Accordingly, the information obtaining part 3 eliminates the above-mentioned high-luminance white color pixels and edge pixels from the entire area of the input image, and sets the remaining area to the target area. The reasons for eliminating the high-luminance white color pixels and edge pixels are as described above.

In condition (5) above, RGB information is used for determining whether or not a pixel is a high-luminance white light pixel. However, color space other than RGB, for example, luminance color difference information, brightness color difference information and the like, may be used. Additionally, the parameters (the threshold values 240 and 10 in condition (5)) defining the high-luminance white light pixel may be appropriately varied in accordance with characteristics and the like of a device that outputs an image after the process. Further, in this embodiment, the relatively bright part in an image is calculated by using luminance information. However, brightness information or color information such as a G signal may be used.

Next, a description will be given of the dynamic range setting part 4 that performs step S3 in FIG. 2. The dynamic range setting part 4 sets a dynamic range according to the following procedure, by using information of the target area obtained by the information obtaining part 3.

The highlight point Range_Max is obtained by calculating cumulative frequencies from the maximum luminance level in each of the histograms of R, G and B of the target area, and setting the maximum one among levels of R, G and B at which values of the cumulative frequencies reach 0.5% of total frequencies to the highlight point Range_Max. The shadow point Range_Min is obtained by calculating cumulative frequencies from the minimum luminance level for each histogram of R, G and B in the entire area of the image, and setting the minimum level in levels of R, G and B as the shadow point Range_Min. In addition, in an image photographed by a digital camera, noise tends to appear at level 0 and level 255. Thus, when calculating the cumulative frequency, it is preferable to set the minimum luminance level to 1 and the maximum luminance level to 254.

The reason for using the histograms of respective colors R, G and B is that, in a case where there are pixels having different color components and the same luminance values, the destruction of the gradation may occur when determining the highlight point only from the luminance histogram, since the color information is ignored. That is, the color information is used at least when setting the highlight point. However, as the color information, other than the RGB information, the luminance color difference information, brightness color difference information or the like may be used. On the other hand, since colors are not well recognized in the shadow part; in order to speed up the processing speed, only the luminance information may be used for setting the shadow point.

In addition, the set parameter (cumulative frequency 0.5%) of the dynamic range is an example and may be appropriately varied. Further, as it is obvious from the description up to here, the information obtaining part 3 may obtain any type of information as the target area information as long as a histogram of the target area can be made.

Next, a description will be given of the processing part 5 that performs step S4 in FIG. 2. The processing part 5 performs the contrast correction on an entire image, by using the dynamic range set by the dynamic range setting part 4. In other words, when a luminance value of the "j"th pixel (j=1, 2, ... N−1, N) is Yin(j), a luminance value Y1(j) after the contrast correction is calculated by equation (6), and a correction coefficient C0(j) is calculated by equation (7) as follows.

$$Y1(j)=\alpha \times Yin(j)+\beta$$

$$\alpha=(255-0)/(Range\_Max-Range\_Min)$$

$$\beta=(1-\alpha)\cdot(255\cdot Range\_Min-0\cdot Range\_Max)/((255-0)-(Range\_Max-Range\_Min)) \quad (6)$$

$$C0j=Y1(j)/Yin(j) \quad (7)$$

Then, by multiplying color components (Rin(j), Gin(j), Bin(j)) by the calculated correction coefficient C0(j), the components after the contrast correction are obtained.

$$(R(i), G1(j), B1(j))=C0j\cdot(Rin(i), Gin(j), Bin(j)) \quad (8)$$

The above-described image processing apparatus 1 can be achieved as not only an independent apparatus but also as a built-in apparatus of another apparatus. Additionally, the image processing apparatus 1 can be achieved by any of hardware, software and a combination of them. A description will be given of a case where the image processing apparatus 1 is achieved by software, by referring to FIG. 16.

Figure 16:
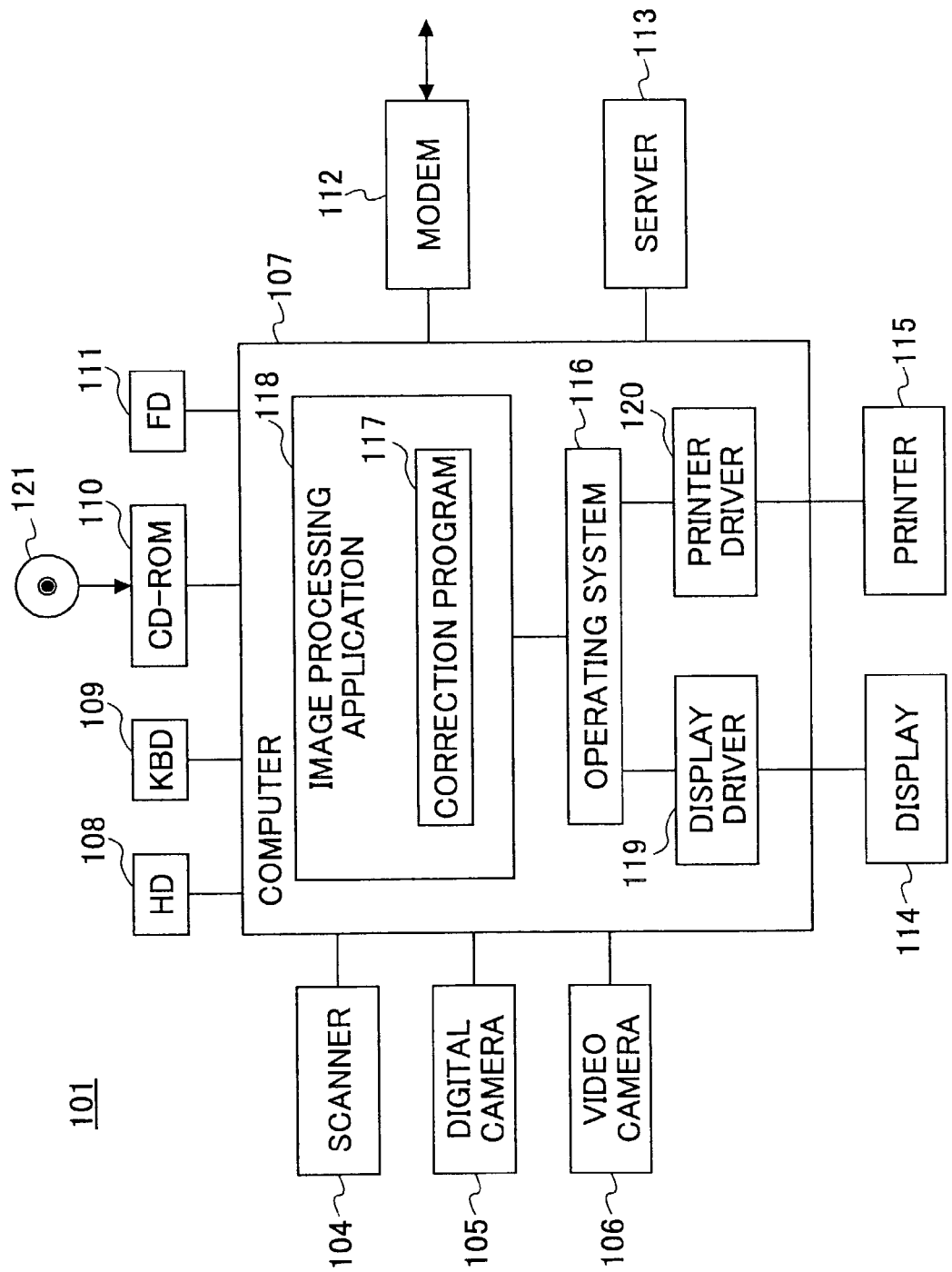
FIG. 16 is a block diagram showing an example of an image processing system.

An image processing system 101 shown in FIG. 16 includes a computer 107 and peripheral equipment. In an example shown in FIG. 16, the peripheral equipment includes a scanner 104, a digital camera 105, and equipment such as a video camera 106 for inputting, to a computer 107, a color image as original image data represented as a matrix of pixels, a keyboard 109 for inputting a command by an operator and other information, a hard disk 108 for a secondary memory (storage), a floppy disk drive 111, a CD-ROM drive 110 for reading a CD-ROM 121 on which data and programs are recorded, a display 114 for outputting an image from the computer 107, a printer 115 and the like. Additionally, a modem 112 and a server 113 are also connected to the computer 107.

The execution of a process of an image processing application 118 that operates on the computer 107 is controlled by an operating system 116. In addition, according to need, the image processing application 118 executes a predetermined image process in cooperation with a display driver 119. The image processing application 118 incorporates a correction program 117 for realizing the function of the image processing apparatus 1 in FIG. 1 on the computer 107. The correction program 117 performs a contrast correction process on image data when the image processing application 118 performs the image processing. The image data after the contrast correction process is output to the display 114 via the display driver 119, or output to the printer 115 via a printer driver 120.

In this case, the image processing system is taken as an example. However, it is also possible to include a function similar to the correction program 117 in an image processing application that operates in a general-purpose computer system. Additionally, if the contrast correction process is performed only when outputting an image, it is also possible to include a function similar to the correction program 117 in the printer driver 120 and display driver 119, or the printer 115 and display 114. The present invention includes programs for realizing the function for such contrast correction on a computer and a computer-readable information storage medium, such as a magnetic disk, an optical disk (for example, the CD-ROM 121 shown in FIG. 16), a magneto-optical disk, a semiconductor memory element and the like, on which the programs are recorded.

<Second Embodiment>

Figure 17:
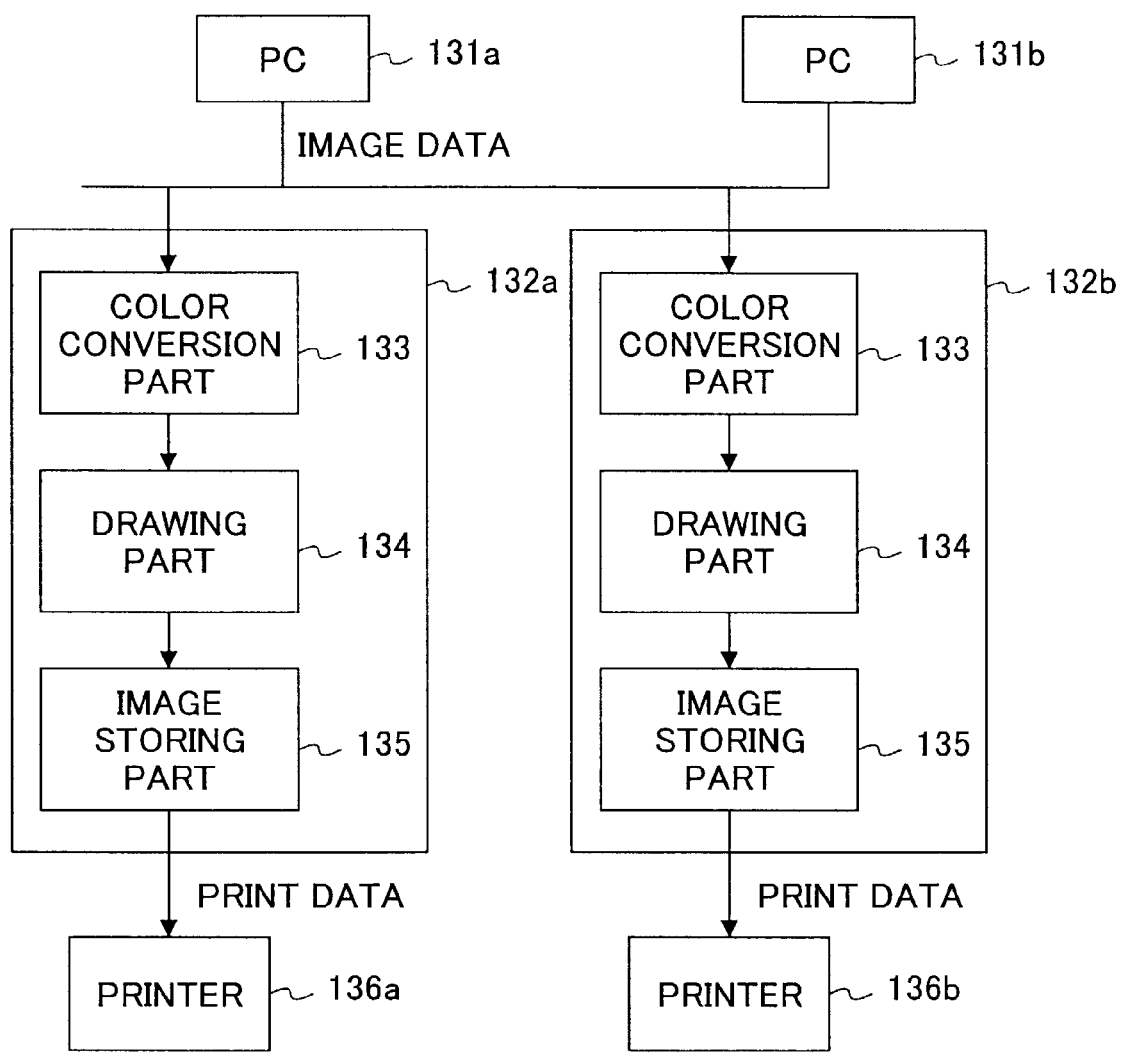
FIG. 17 is a block diagram showing the structure of a second embodiment.

FIG. 17 is a block diagram showing the structure of a second embodiment of the present invention. An image output system shown in FIG. 17 includes a plurality of personal computers (PCs) 131a and 131b and a plurality of printers 136a and 136b. In the image output system, an arbitrary personal computer can output an image to an arbitrary printer. The image output system also includes image processing apparatuses 132a and 132b corresponding to the printers 136a and 136b, respectively.

In the image output system, when an operator selects the printer 136a and inputs an output instruction by using the personal computer 131a, the personal computer 131a sends image data created by imaging an image and by various DTP software to the image processing apparatus 132a. The image processing apparatus 132a performs, after performing the contrast correction process on the sent image data, a color conversion process on the image data in order to convert the image into a plurality of output color components C (cyan), M (magenta), Y (yellow) and K (black), for example, so that print data are generated, and sends the print data to the printer 136a and causes the printer 136a to print the print data.

In FIG. 17, the image processing apparatuses 132a and 132b are shown as separate apparatuses. However, as will be described more specifically later, all the functions of the image processing apparatuses 132a and 132b may be included in printer drivers that operate on the personal computers 131a and 131b, respectively. Further, partial functions of the image processing apparatuses 132a and 132b may be included in the respective printer drivers, and the remaining functions may be included in the printers 136a and 136b, respectively. In this way, various configurations may be employed.

Each of the image processing apparatuses 132a and 132b includes a color conversion part 133, a drawing part 134 that performs a halftone process and the like, and an image storing part 135 for temporarily storing a print image for one page drawn by the drawing part 134.

Figure 18:
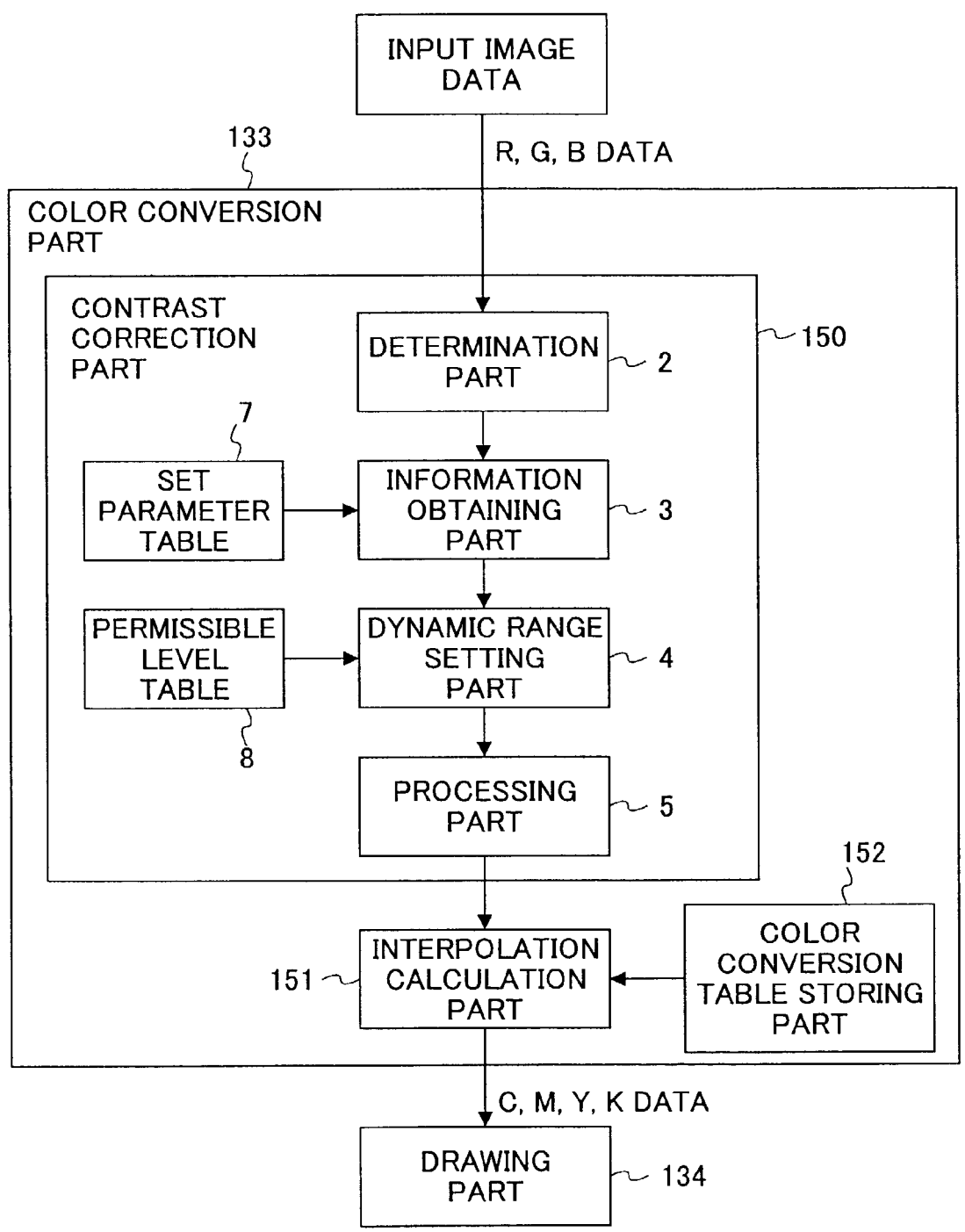
FIG. 18 is a block diagram showing the structure of a color conversion part in FIG. 17.

As shown in FIG. 18, the color conversion part 133 includes a contrast correction part 150, an interpolation calculation part 151, and a color conversion table storing part 152. The contrast correction part 150 includes a determination part 2, an information obtaining part 3, a dynamic range setting part 4 and a processing part 5 that are the same as those corresponding parts of the image processing apparatus 1 of the first embodiment, and also includes a set parameter table 7 for the information obtaining part 3 and a permissible level table 8 for the dynamic range setting part 4.

In the following, a description will be given of a process at the image processing apparatus 132a, by taking a case where the personal computer 131a or 131b sends RGB image data to the image processing apparatus 132a, the image processing apparatus 132a converts the image data into CMYK print data, and the printer 136a outputs an image based on the CMYK print data.

When the RGB image data are sent to the image processing apparatus 132a, in the contrast correction part 150 of the color conversion part 133, the determination part 2 determines the type of the image, and the information obtaining part 3 obtains information of a target area corresponding to the determined type. Next, the dynamic range setting part 4 sets a dynamic range. The processing part 5 performs the contrast correction based on the set dynamic range.

In this case, since each printer that is used has a different reproduction area, the permissible level of the destruction of the gradation or the deterioration of the gradation differs from printer to printer. Thus, the contrast correction part 150 maintains parameter information relating to a printer from which an output will be made (in this case, 136a) as a table. More specifically, the contrast correction part 150 maintains the parameter defining the high-luminance white light pixels in the above-mentioned condition (5) in the set parameter table 7, and maintains a cumulative frequency parameter for setting the dynamic range in the permissible level table 8. The information obtaining part 3 reads the parameters from the set parameter table 7 in the obtaining process of the target area information. In addition, the dynamic range setting part 4 reads the cumulative frequency parameter from the permissible level table 8 when setting a dynamic range.

Next, the color conversion part 133 selects an optimum table from color conversion tables stored in the color conversion table storing part 152 and sends the selected table to the interpolation calculation part 151. The interpolation calculation part 151 performs a memory map interpolation (which will be described later) on the input RGB image data of a memory map of the selected color conversion table, converts RGB image data into CMYK print data and sends the CMYK print data to the drawing part 134.

Figure 19:
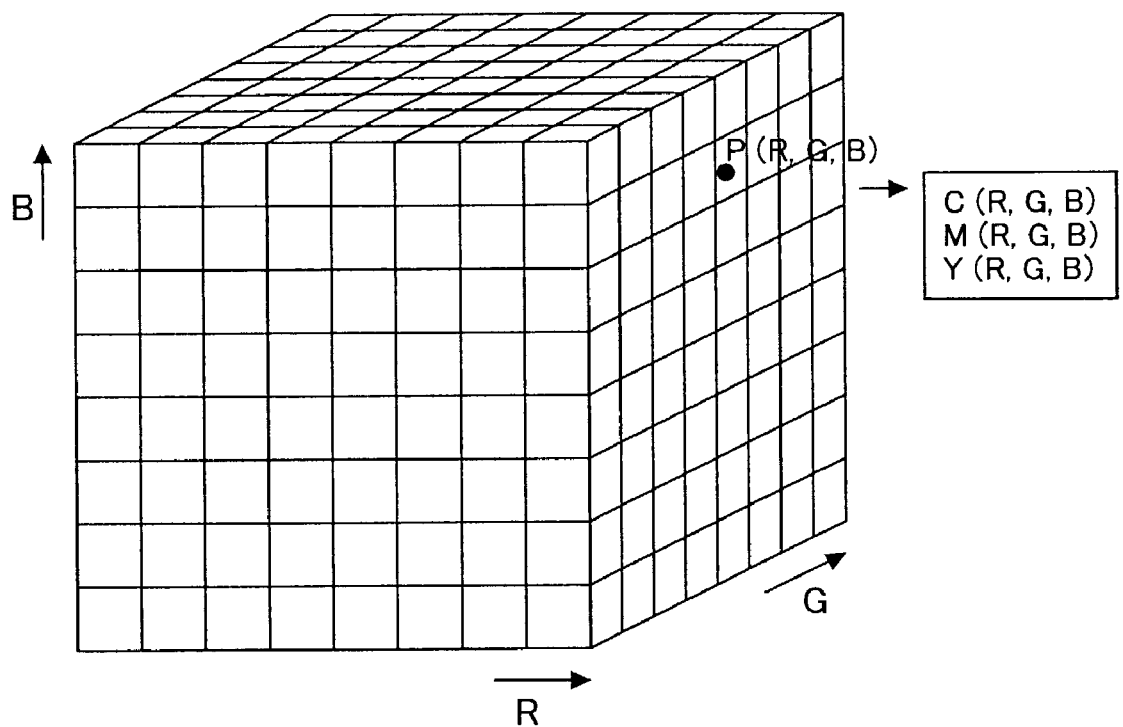
FIG. 19 is a diagram for explaining memory map interpolation.

As shown in FIG. 19, when a RGB space is regarded as an input color space, in the memory map interpolation, the RGB space is divided into solid figures of the same kind. Then, in order to obtain an output value P at input coordinates (RGB), a cube including the input coordinates (RGB) is selected, and linear interpolation is performed based on output values on predetermined points among 8 points of the selected cube and a position in the solid figure, that is, a distance from each of the predetermined points is determined. The output value P corresponds to each of C, M and Y value. To the coordinates (RGB) of the input space used in the interpolation calculation, values of C, M and Y are determined beforehand with respect to RGB (L*a*b) obtained by measuring the relationship between actual input and output (L*a*b and CMY) and calculating by using the data according to the least squares method. Thereafter, a CMY signal is converted into a CMYK signal by calculation according to the following equation (9).

$$K = \alpha \cdot \min(C, M, Y)$$

$$C1 = C\beta \cdot K$$

$$M1 = M\beta \cdot K$$

$$Y1 = Y\beta \cdot K \quad (9)$$

Further, as a color conversion method, it is possible to use a method that performs color conversion on a memory map instead of image data. For example, a correction coefficient is sent to the interpolation calculation part 151, color conversion is performed on the input RGB image data of a memory map of the selected color conversion table according to the above-mentioned equation (9), and the memory map is rewritten to a CMY signal after the color conversion. Next, using the changed memory map, the memory map interpolation is performed on every pixel. Generally, a method that rewrites not image data but a memory map as mentioned above has an advantage in speeding up the process.

The print data converted into CMYK by the interpolation calculation part 151 as described above is sent to the drawing part 134. The image storing part 135 temporarily stores print image data page by page on which the halftone process is performed by the drawing part 134. The print image is printed by the printer 136a.

Of course, the image processing apparatuses 132a and 132b may be realized as separate hardware apparatuses. However, it is also possible for the printers 136a and 136b to include the whole functions or partial functions of the image processing apparatuses 132a and 132b. In addition, it is also possible to realize the whole functions or partial functions of the image processing apparatus by software. For example, the whole or partial functions of the image processing apparatus may be provided to the printer drivers that operate on the personal computers 131a and 131b. When providing functions to the printer drivers, among the functions of the interpolation calculation part 151, if the printer driver has the functions up to C, Y, K data generation of the above-mentioned equations (9), and the printer has the conversion function into (C1, M1, Y1 and K) data, generally, the amount of data to be transferred is reduced and such a configuration has an advantage in speeding up the process. The present invention includes programs of such a printer driver and the like and various information recording media (computer-readable recording media), such as the CD-ROM 121 shown in FIG. 16, on which the programs are recorded.

Figure 20:
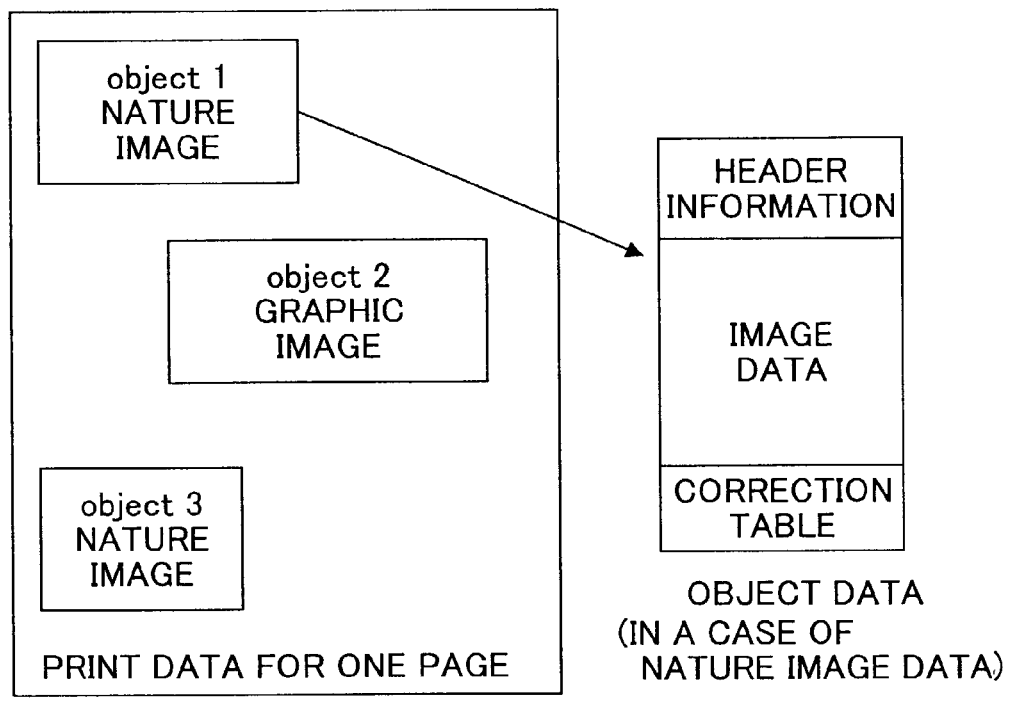
FIG. 20 is a diagram for explaining print data including a plurality of objects and information attached to the object.

In a case where print data for one page includes a plurality of objects such as nature images and graphic images, for example, a case where print data includes objects 1, 2 and 3 as shown in FIG. 20, it is necessary for the color conversion part 133 to select a color conversion table for each of the objects. In addition, generally, each of the objects 1 and 3 that are nature images has a different correction coefficient. Thus, the object 1 and object 3 have different memory maps that are rewritten by the interpolation calculation part 151. Accordingly, in this case, as shown in the right part of FIG. 20, it is necessary to send the correction coefficient to the image processing apparatuses 132a and 132b by attaching the correction coefficient to a header of image data (it is also possible to send the correction coefficient and the image data separately). Further, when providing the functions to the printer driver, it is also possible to configure the image output system so as to read and use a device profile that is standardized by the ICC (Inter Color Consortium).

<Third Embodiment>

Figure 21:
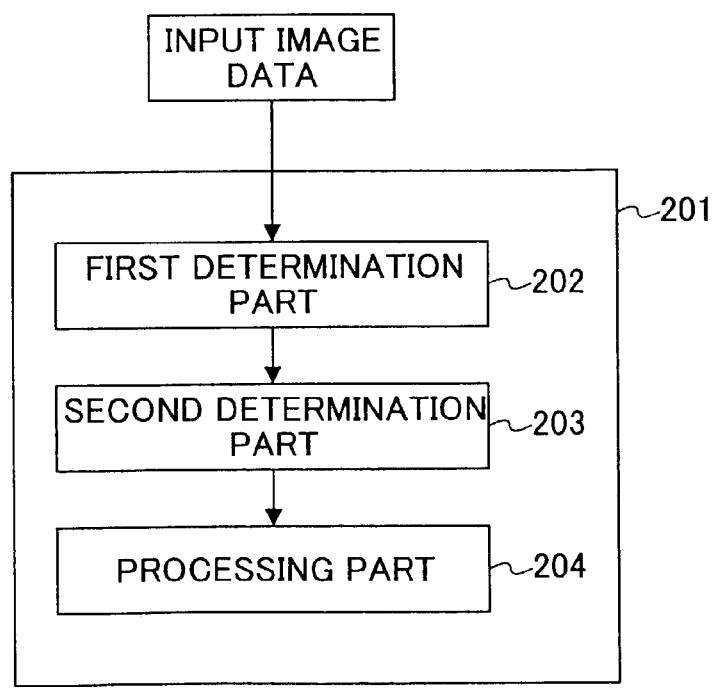
FIG. 21 is a block diagram showing the structure of a third embodiment.
Figure 22:
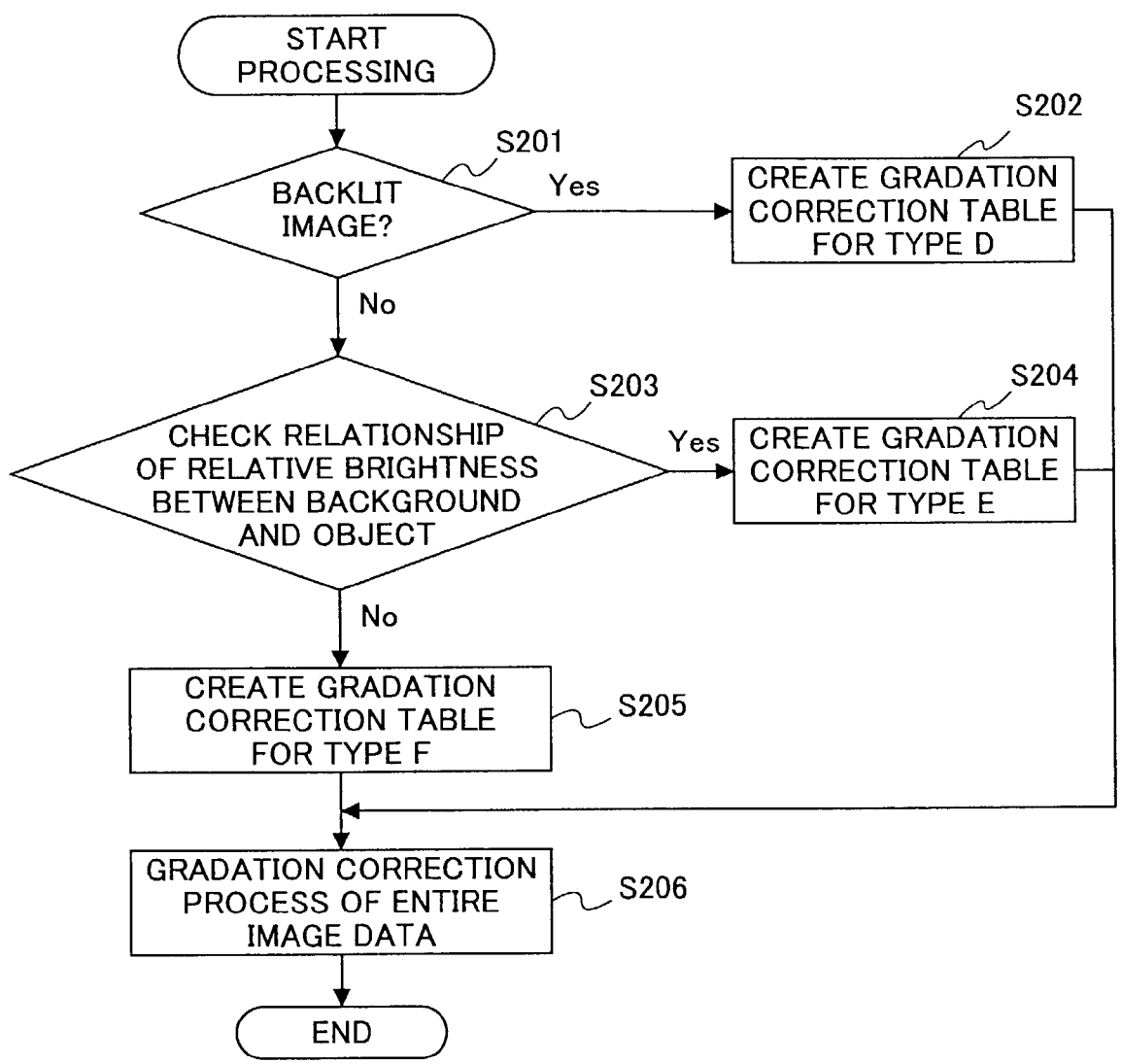
FIG. 22 is a flow chart for explaining the procedure of the third embodiment.

FIG. 21 is a block diagram showing the structure of a third embodiment of the present invention. FIG. 22 is a flow chart for explaining the procedure in this embodiment.

An image processing apparatus 201 shown in FIG. 21 performs the gradation correction of an image and includes a first determination part 202, a second determination part 203, and a processing part 204. The first determination part 202 performs the process of step S201 in FIG. 22. The process of step S201 determines whether or not an input image is a type D, according to a color signal of a background area of input color image data. The second determination part 203 performs the process of step S203 in FIG. 22 in a case where the first determination part 202 determines that the image is not the type D (NO in step S201). The process of step S203 determines whether the image is a type E or a type F by checking the relationship of the relative brightness between the background area and an object area. The processing part 204 performs the appropriate gradation correction process corresponding to the type of the image determined by the first determination part 202 and the second determination part 203. More specifically, the processing part 204 creates a gradation correction table corresponding to the type in step S202 if YES in step S201, in step S204 if YES in step S203, and in step S205 if NO in step S203 in FIG. 22. Further, by using the gradation correction table, the processing part 204 performs a gradation correction process of step S206 in FIG. 22 on image data.

In the following, a detailed description will be given of each of the parts of the image processing apparatus 201.

First, a description will be given of the first determination part 202 that performs step S201 in FIG. 22. The first determination part 202 determines whether or not an input image is an image photographed against backlight (type D). The image determined as the type D is an image having a background area mainly comprising high-luminance white light, that is, a complete backlit image having a whitish background. Various methods may be employed for this determination. However, among the various methods, two examples will be explained below.

Figure 23:
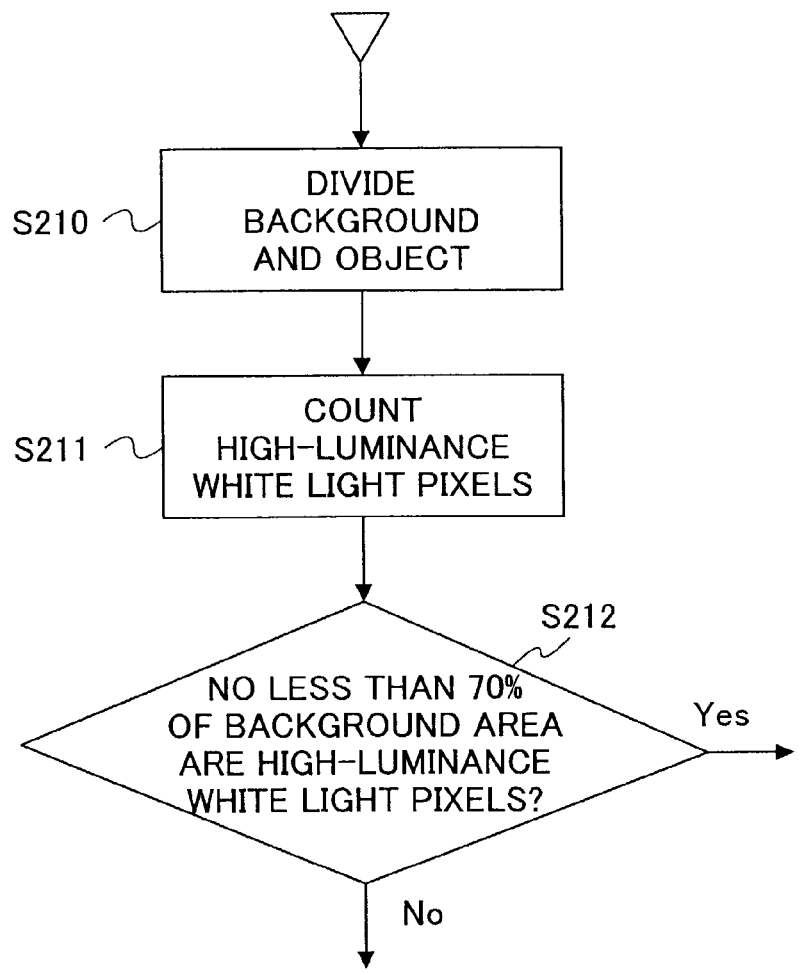
FIG. 23 is a flow chart for explaining an example of a determination process of a first determination part in FIG. 21.
Figure 24:
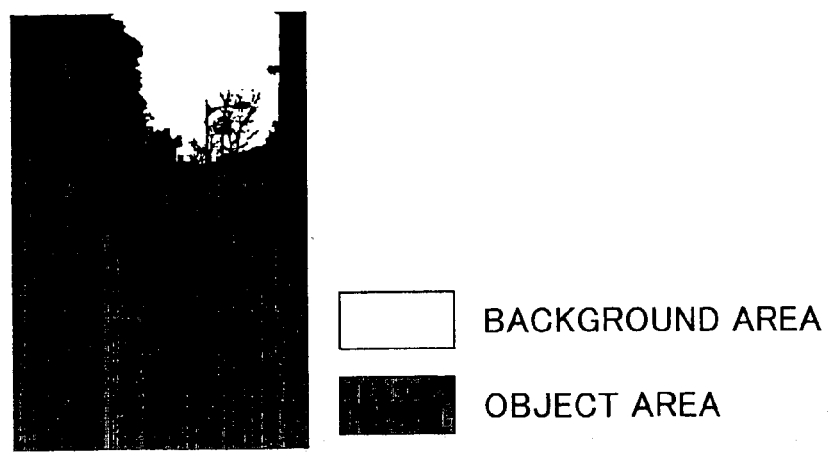
FIG. 24 is an image showing a background area and an object area in the backlit scene image in FIG. 3.

In a first method, as shown in a flow chart in FIG. 23, image division is performed on an input image in step S210 so as to divide the input image into a background area and an object area. In the case of FIG. 3, the image is divided as shown in FIG. 24. Then, in the background area, high-luminance white light pixels are counted in step S211. Step S212 determines whether or not no less than 70%, for example, of pixels of the background area are the high-luminance white light pixels. If no less than 70% of pixels of the background area are the high-luminance white light pixels (YES in step S212), the image is determined as the type D, and the process proceeds to step S202 in FIG. 22). If the decision result in step S212 is NO, the process proceeds to step S203 in FIG. 22. The high-luminance white light pixels refer to pixels of which color components (R, G, and B) satisfy the above-mentioned equation (5). Further, it is also possible to simultaneously perform the image division process and the counting process of the high-luminance white light pixels.

Figure 25:
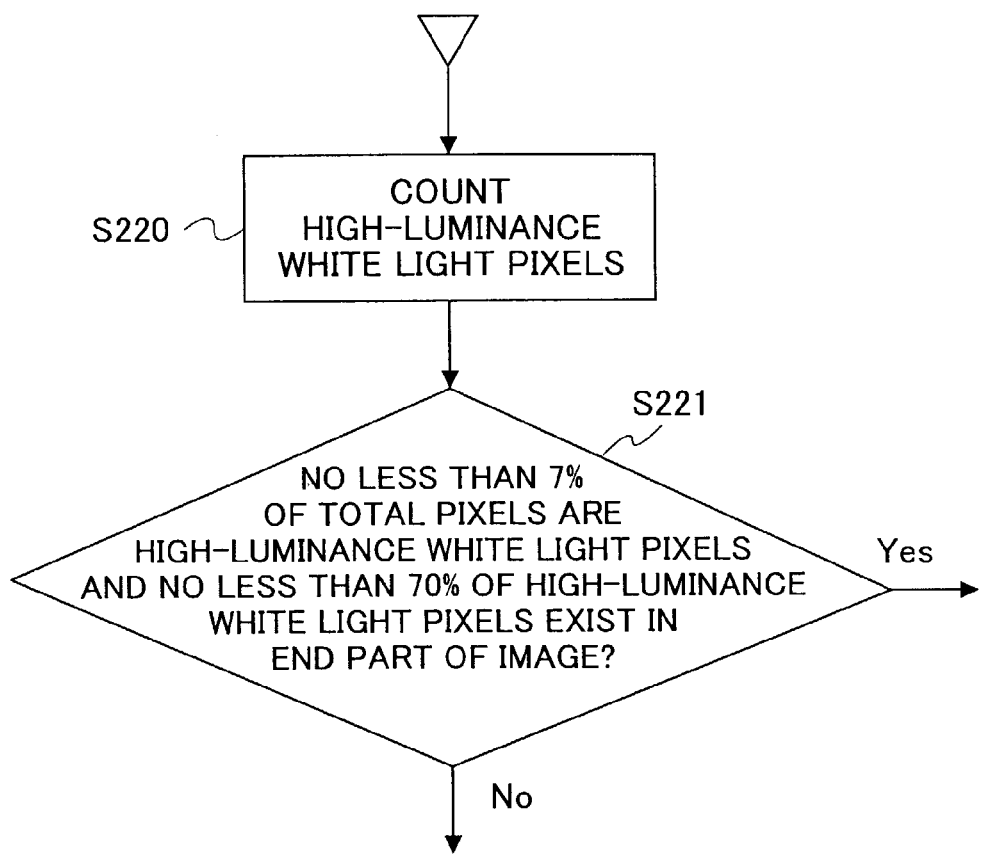
FIG. 25 is a flow chart for explaining another example of the determination process of the first determination part in FIG. 21.
Figure 26:
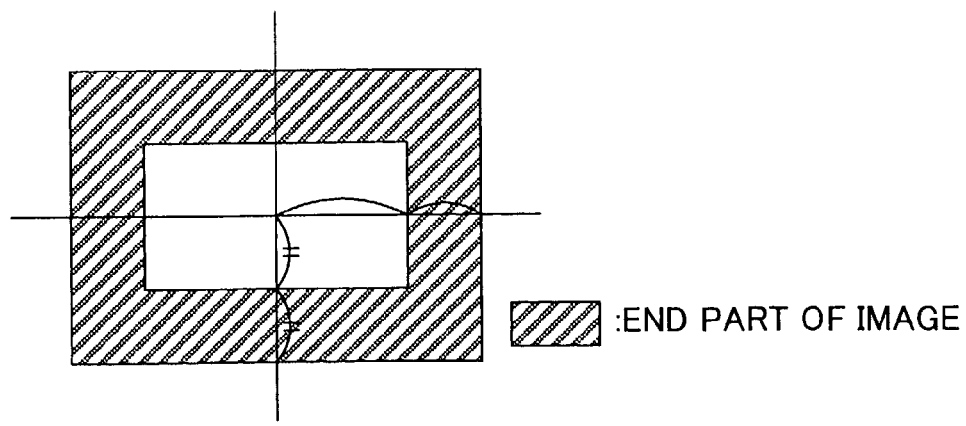
FIG. 26 is an explanatory diagram of an end part of an image.

In a second method, as shown in a flow chart of FIG. 25, the high-luminance white light pixels are counted with respect to the whole area of an input image in step S220. At this moment, step S220 also identifies whether or not each pixel belongs to an end part of the image. The end part of the image refers to a peripheral area of an image as shown by a hatched part in FIG. 26. Then, step S221 determines whether or not the number of the high-luminance white light pixels is no less than 7%, for example, of the total pixel number, and at the same time, no less than 70% of the high-luminance white light pixels are in the end part of the image. If the decision result in step S221 is YES, the image is determined as the type D, and the process proceeds to step S202 in FIG. 22. If the decision result in step S221 is NO, the process proceeds to step S203 in FIG. 22.

Next, a description will be given of the second determination part 203 that performs step S203 in FIG. 22. The second determination part 203 determines the image as the type E when, in the image that is not determined as the type D by the first determination part, the background area is relatively darker than the object area. When the background area is not relatively darker than the object area, the second determination part 203 determines the image as the type F. FIG. 4 is the portrait image photographed at night showing an example of the image that is determined as the type E.

Figure 27:
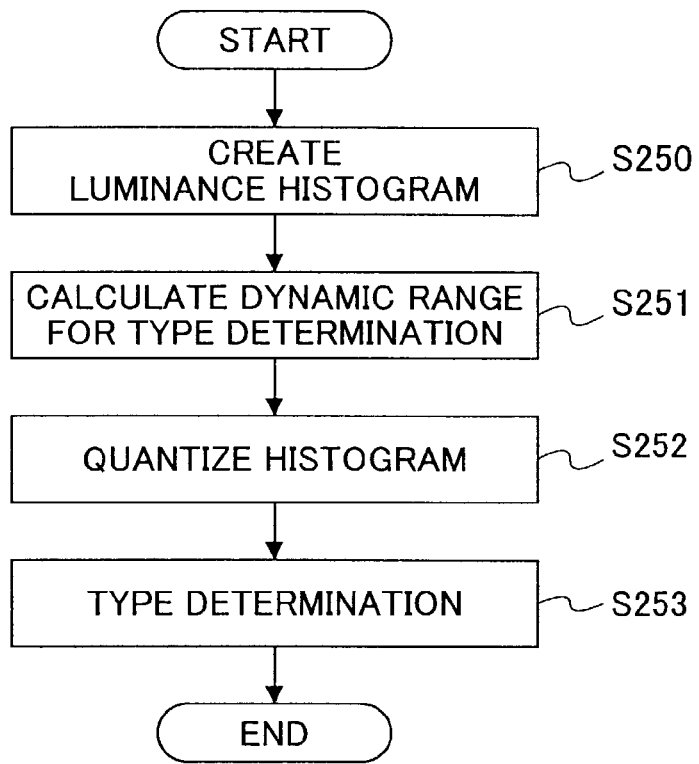
FIG. 27 is a flow chart for explaining a determination process of a second determination part in FIG. 21.

A description will be given of the process of each step performed by the second determination part 203, with reference to FIG. 27 showing the process flow.

Step S250 creates a luminance histogram of the whole area of an input image. A luminance Y is obtained by the following equation using color components (R, G, B). In each of the above-mentioned embodiments, the luminance Y is obtained in a similar manner.

$$Y=0.299 \cdot R+0.587 \cdot G+0.114 \cdot B \quad (10)$$

Step S251 obtains dynamic ranges (Scene_Min, Scene_Max) for the type determination from the luminance histogram created in step S250. More specifically, in the luminance histogram, a cumulative frequency is obtained from the minimum level, and a level at which the value of the cumulative frequency reaches 1%, for example, of the total frequency is set to the shadow point Scene_Min. In addition, the highlight point Scene_Max is set to a level at which the cumulative frequency obtained from the maximum level reaches 1%, for example, of the total frequency. Further, in an image photographed by a digital camera, noise tends to occur at level 0 and level 255. Thus, it is preferable to set the minimum level to 1 and the maximum level to 254.

In order to determine a relatively dark part in the image from an area of distribution of the luminance histogram, step S252 quantizes an area between the shadow point Scene_Min and the highlight point Scene_Max that are obtained in step S251 into four sections 0, 1, 2 and 3 as shown in FIG. 14, by dividing the area into four parts. The section 0 is the relatively dark area of distribution.

Figure 28:
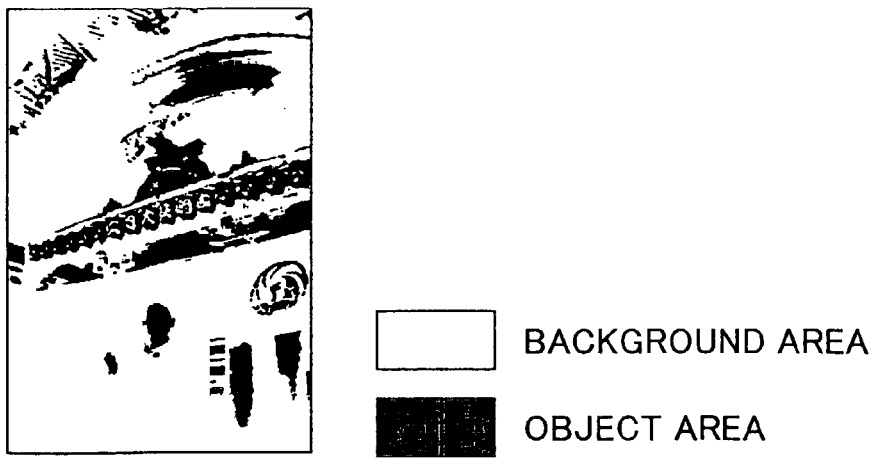
FIG. 28 is an image showing a quantized image of the portrait image of FIG. 4.

Step S253 creates an image (an image with excessive contrast) in which luminance levels are quantized into four levels, by replacing pixels having the luminance levels of the sections obtained in step S252 with respect to the input image with a representative level. In a case of the portrait image photographed at night shown in FIG. 4, a quantized image as shown in FIG. 28 is obtained. Then, the image is determined as the type E in a case where an average luminance of a background area of the quantized image and that of an object area (a black area in FIG. 28) of the same are calculated and compared with each other, and where the average luminance of the background area is lower than that of the object area (in a case where the background is relatively darker than the object). In cases other than the above-mentioned case, the image is determined as the type F. The reason for quantizing the image is to simply recognize the relative contrast relationship between the brightness of the background and that of the object.

The image determined as the type E is an image in which the background is relatively darker than the object. That is, images such as a night portrait image, a night scene image, an underexposed image photographed normally and the like. The images determined as the type F are such as an image photographed not completely against light but against light in which the background is brighter than the object, a correctly exposed image photographed normally, an underexposed image photographed normally and the like.

There are two reasons for further performing the type determination by the second determination part 203 after the first determination part 202 determines whether or not an input image is an image photographed completely against light (the type D). A first reason is that erroneous determination hardly occurs in determining whether or not an image is photographed completely against light since it is easily determined. Additionally, the second determination part 203 calculates the dynamic ranges for the type determination in order to extract a relatively bright part and a dark part in the image. This is for simplifying the relationship between the brightness of the background and that of the object, by clarifying the bright part and the dark part in the image that has unsatisfactory contrast due to underexposure or the like. Accordingly, when the same quantization is performed on the type D image that has the originally and absolutely bright background and is considered to be an image photographed against light, the image tends to be mistaken for the type F image that is correctly exposed. For this reason, it is necessary to perform the determination of the type D by the first determination part 202, and this is a second reason.

Further, in the above-mentioned determination process of the image type, decimation may be suitably performed in calculating the high-luminance white light area and luminance histogram. In addition, the description is given of the example where the RGB information is used for determining whether or not the background area mainly includes the high-luminance white light pixels. However, a color space other than RGB, such as luminance color difference information or brightness color difference information may be used for the determination. Furthermore, the second determination part 203 calculates the relatively dark part in the image using the luminance information. However, color information such as brightness information or G signals may also be used. Additionally, it is also possible to vary the determination parameters (the threshold values in the above-mentioned condition (5)) of the high-luminance white light and the determination parameter (cumulative frequency 1%) of the dynamic ranges for the type determination.

Furthermore, an operator may handle the determination of the first determination part 202. For example, the determination may be made such that, by preparing means for inputting a decision result of the operator such as a "backlight correction key", the process proceeds regarding an image as the type D when the backlight correction key is pressed, and the process proceeds to the determination process of the second determination part 203 when the backlight correction key is not pressed.

Figure 29:
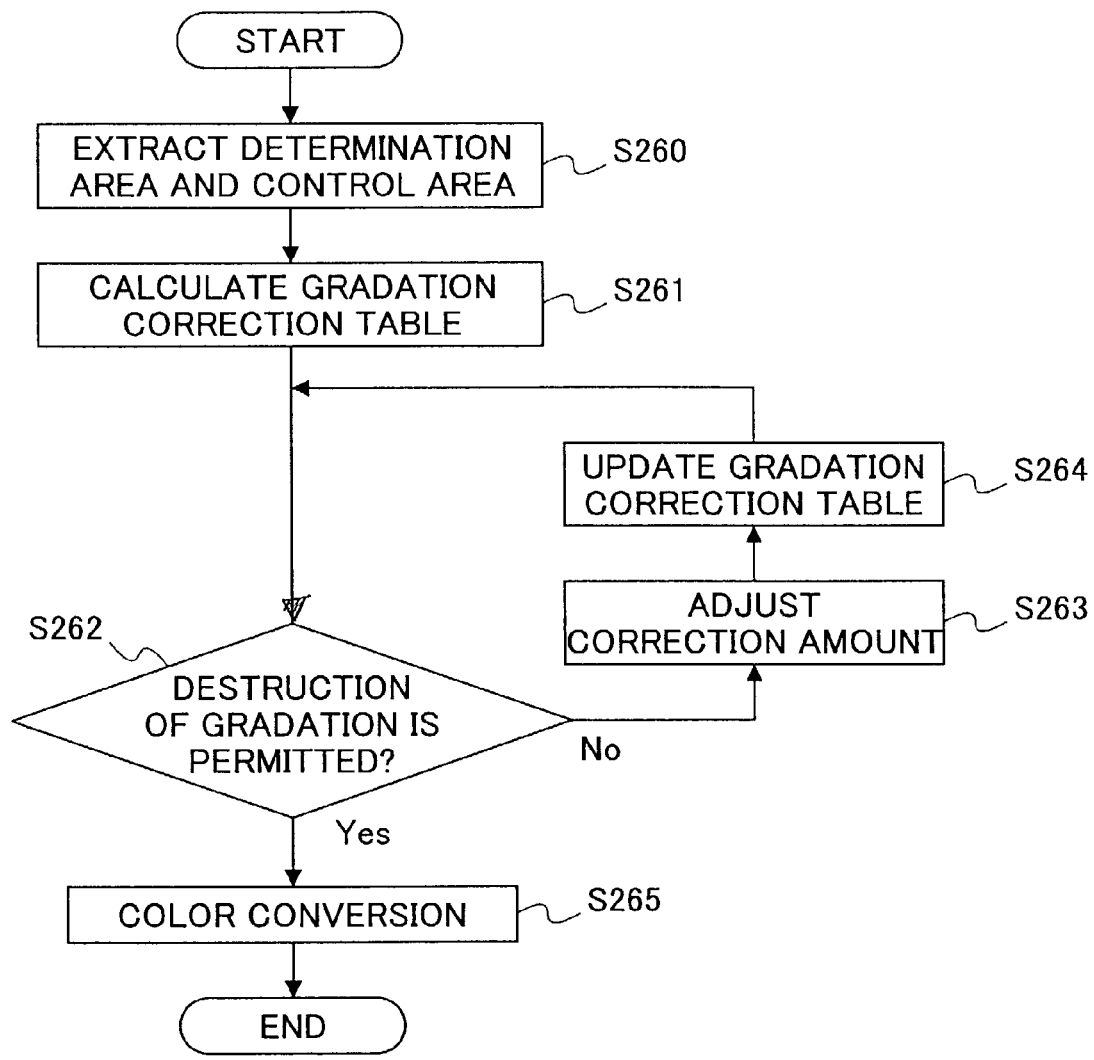
FIG. 29 is a flow chart for explaining the process of a processing part in FIG. 21.

Next, a description will be given of the processing part 204 that performs steps S203, S204 and S206 in FIG. 22, by referring to a flow chart in FIG. 29.

Step S260 extracts a determination area and a control area. The determination area is an area for determining an exposure correction amount. The control area is an area used when controlling the correction. All pixels are divided into these two areas as described below.

For the types D and F where the background is brighter than the object, the object area is the determination area. Additionally, highlight pixels of the background area and object area (a whole image, namely) form the control area. On the other hand, for the type E where the background is darker than the object (step S204 in FIG. 22), the object area is the determination area and the highlight pixels in the object area form the control area. The highlight pixels refer to pixels belonging to the section 3 of the quantized luminance histogram as shown in FIG. 14, for example.

Step S261 determines an initial value of the correction amount in accordance with information of the determination area, for example, a luminance median value, and the type of an image (this corresponds to the determination of the exposure). Various methods may be employed for the determination. For example, when the luminance median value is smaller than a first threshold value, a first predetermined value is set to the initial value when the image is the type D, and the initial value is set to a value calculated by a first equation using the luminance median value when the image is the type E or F. In a case where the luminance median value is greater than the first threshold value and smaller than a second threshold value, irrespective of the type, the initial value is set to a value calculated by a second equation using the luminance median value. In a case where the luminance median value is greater than the second threshold value, the initial value is set to a second predetermined value irrespective of the type. Then, using the initial value of the correction amount a gradation correction table f0(x) of an initial stage is created in step S261.

$$f(0)x = \{(x/255)^\delta\} \cdot 255 \quad (11)$$

Next, step S262 evaluates whether or not the destruction of the gradation or the deterioration of the gradation is within a permissible range when the gradation correction is performed using a current gradation correction table. More specifically, using the current gradation correction table, step S262 performs conversion of pixels belonging to the control area by employing the same color conversion method of step S265 that will be described later. Then, the destruction of the gradation of image data after the gradation correction is evaluated. For example, with respect to the saturated pixels that exceed the reproducing range (that is, over level 255) of the output device, an average transcendental value is calculated. That is, with respect to "k" saturated pixels, the maximum level lj (j=1, 2, . . . K) of a saturated color component is obtained for each of the pixels, and an average value Oave that is the difference between the maximum level and the upper limit of the reproducing range is calculated as a degree of saturation (chroma).

$$\text{Oave} = \Sigma(lj - 255)/K \quad (12)$$

where j 1, 2 . . . K

Then, when the degree of saturation is no less than a certain threshold value, it is determined that the degree of saturation, that is, the destruction of the gradation, is not permitted.

Further, the degree of saturation may be the ratio K/M of the number of the saturated pixels (K) in the control area to the number of pixels (M) in the control area, or the ratio K/N of the number of the saturated pixels (K) to the number of pixels (N) in the whole area of the image.

Figure 30:
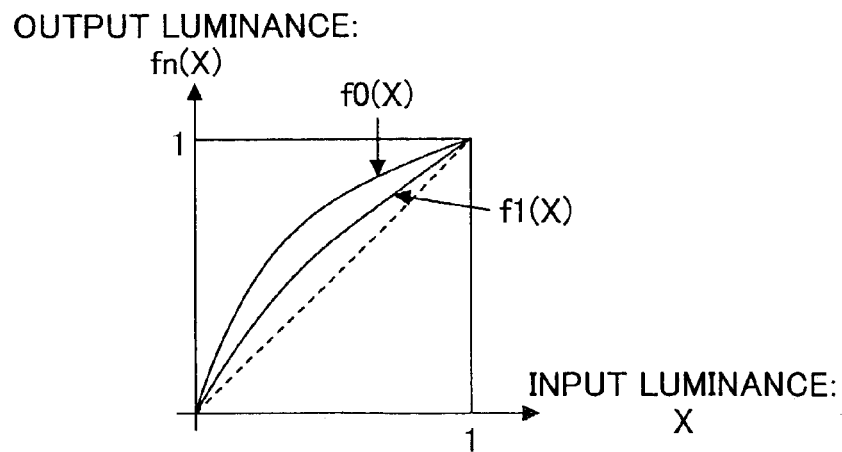
FIG. 30 is a diagram showing an example of a gradation correction table.

When step S262 determines that the destruction of the gradation is not permitted (NO in step S262), step S263 adjusts the correction amount so that the correction amount becomes a smaller value, step S264 creates the gradation correction table fi(x) using the correction amount, and step S262 determines again whether or not the destruction of the gradation is permitted. This update process of the gradation correction table is repeated until it is determined that the gradation correction is permitted (the above-mentioned update process of the gradation correction table according to a loop of steps S262 through S264 is the exposure control). FIG. 30 shows examples of the gradation correction table f0(x) in the initial stage, and the gradation correction table f1(x) after the first update.

Step S265 performs color conversion on the input image by using the final gradation correction table fn(x) obtained by the above-mentioned procedure. In the following, the color conversion with respect to RGB data of the input image will be explained.

A gradation correction coefficient C1(j) is calculated by defining an output luminance value Y2(j) after the correction according to the gradation correction table fn(x), with respect to a luminance value Y1(j) (j=1, 2, . . . , N where N is a total number of pixels).

$$C1(j) = Y2(j)/Y1(j) \quad (13)$$
$$= fn(Y1(j))/Y1(j)$$

Then, by using this gradation correction coefficient, color image signals (R1(j), G1(j) and B1(j)) are converted so as to obtain output color signals (R2(j), G2(j) and B2(j)).

$$(R2(j), G2(j), B2(j)) = C1(j) \cdot (R1(j), G1(j), B1(j)) \quad (14)$$

The above-described image processing apparatus 201 may be realized not only as a separate apparatus but also as a built-in apparatus. In addition, the image processing apparatus 201 may be realized by any of hardware, software and a combination of hardware and software.

A description will be given of a case where the image processing apparatus 201 is realized by software, by referring to FIG. 16. For example, in the image processing system 101 as shown in FIG. 16, it is possible to provide the correction program 117 to the image processing application 118 that operates on the computer 107 for realizing the functions (the procedure shown in FIG. 22) of the image processing apparatus 201 shown in FIG. 21 on the computer 107. When performing the image processing by the image processing application 118, the correction program 117 performs the gradation correction process on the image data. The image data after the gradation correction are output to the display 114 through the display driver 119, or output to the printer 115 through the printer driver 120. Further, when the gradation correction process is performed only when outputting an image, the printer driver 120 and the display driver 119, or the printer 115 and the display 114 may include the same functions as those of the correction program 117 has. The present invention includes programs for realizing the functions for such contrast correction and computer-readable information storage media on which the programs are recorded such as a magnetic disk, an optical disk, a magnetic optical disk, a semiconductor memory element and the like.

<Fourth Embodiment>

Figure 31:
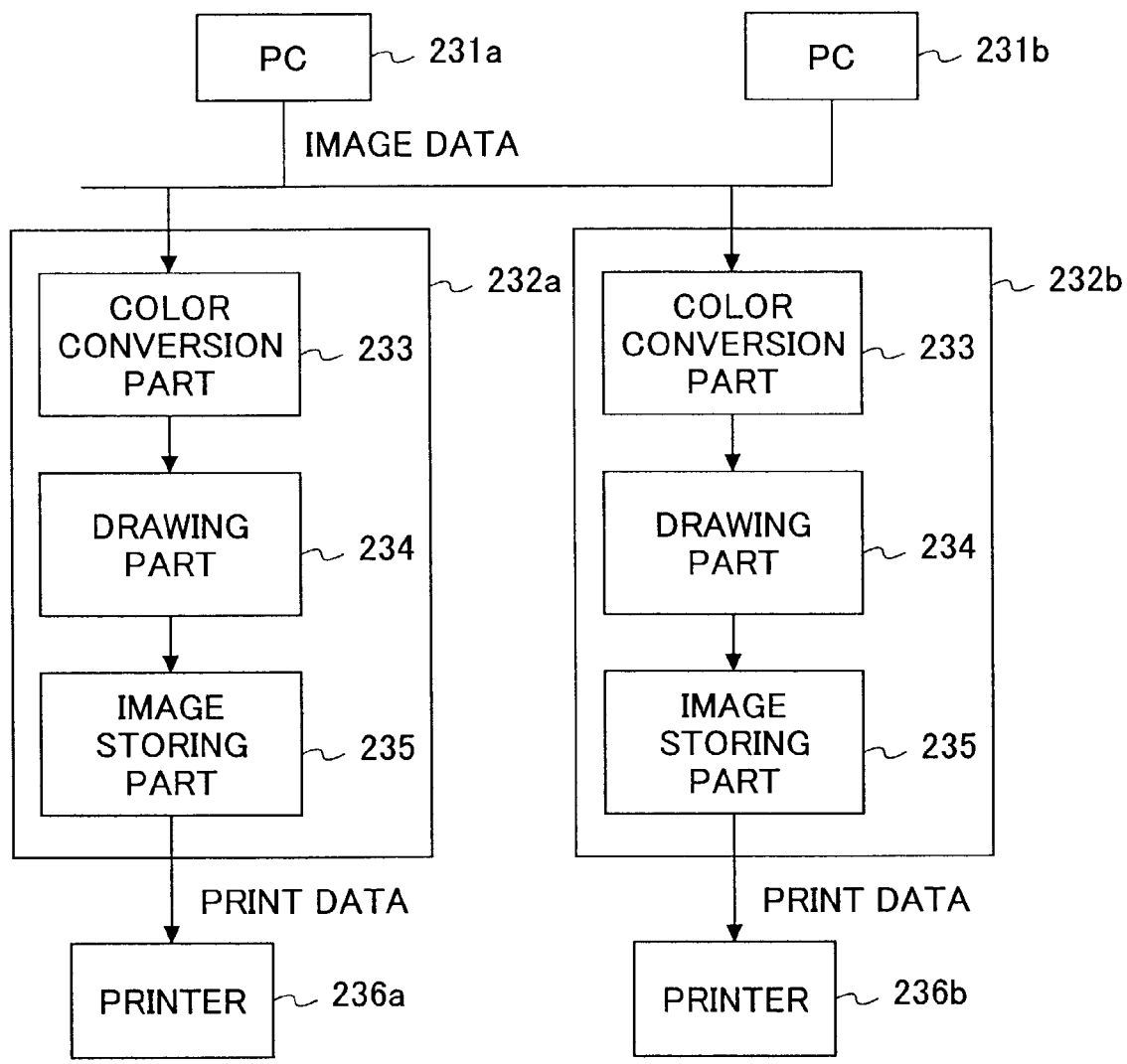
FIG. 31 is a block diagram showing the structure of a fourth embodiment.

FIG. 31 is a block diagram showing the structure of a fourth embodiment of the present invention. An image output system shown in FIG. 31 includes a plurality of personal computers (PC) 231a and 231b and a plurality of printers 236a and 236b, and can output an image from an arbitrary one of the personal computers to an arbitrary one of the printers. The image output system further includes image processing apparatuses 232a and 232b corresponding to the printers 236a and 236b, respectively.

In this image output system, when an operator selects the printer 236a and inputs an output instruction thereto, for example, the personal computer 231a sends image data captured by imaging an image or the like and image data created by various DTP software to the image processing apparatus 232a. The image processing apparatus 232a performs the gradation correction process on the sent image data, thereafter performs the color conversion process so as to convert the image data into a plurality of output color components C (cyan), M (magenta), Y (yellow) and K (black), for example, and to generate print data. The print data are sent to the printer 236a and printed.

Further, the image processing apparatuses 232a and 232b are shown as separate apparatuses. However, as will be described later more specifically, printer drivers that operate on the personal computers 231a and 231b may include all the functions of the image processing apparatuses 232a and 232b, respectively. Additionally, it is also possible that printer drivers include the partial functions of the image forming apparatuses 232a and 232b and the printers 236a and 236b include the rest of the functions. As mentioned above, various realizing forms may be employed.

Each of the image processing apparatuses 232a and 232b includes a color conversion part 233, a drawing part 234 that performs the halftone process and the like, and an image storing part 235 for temporarily storing a print image for one page drawn by the drawing part 234.

Figure 32:
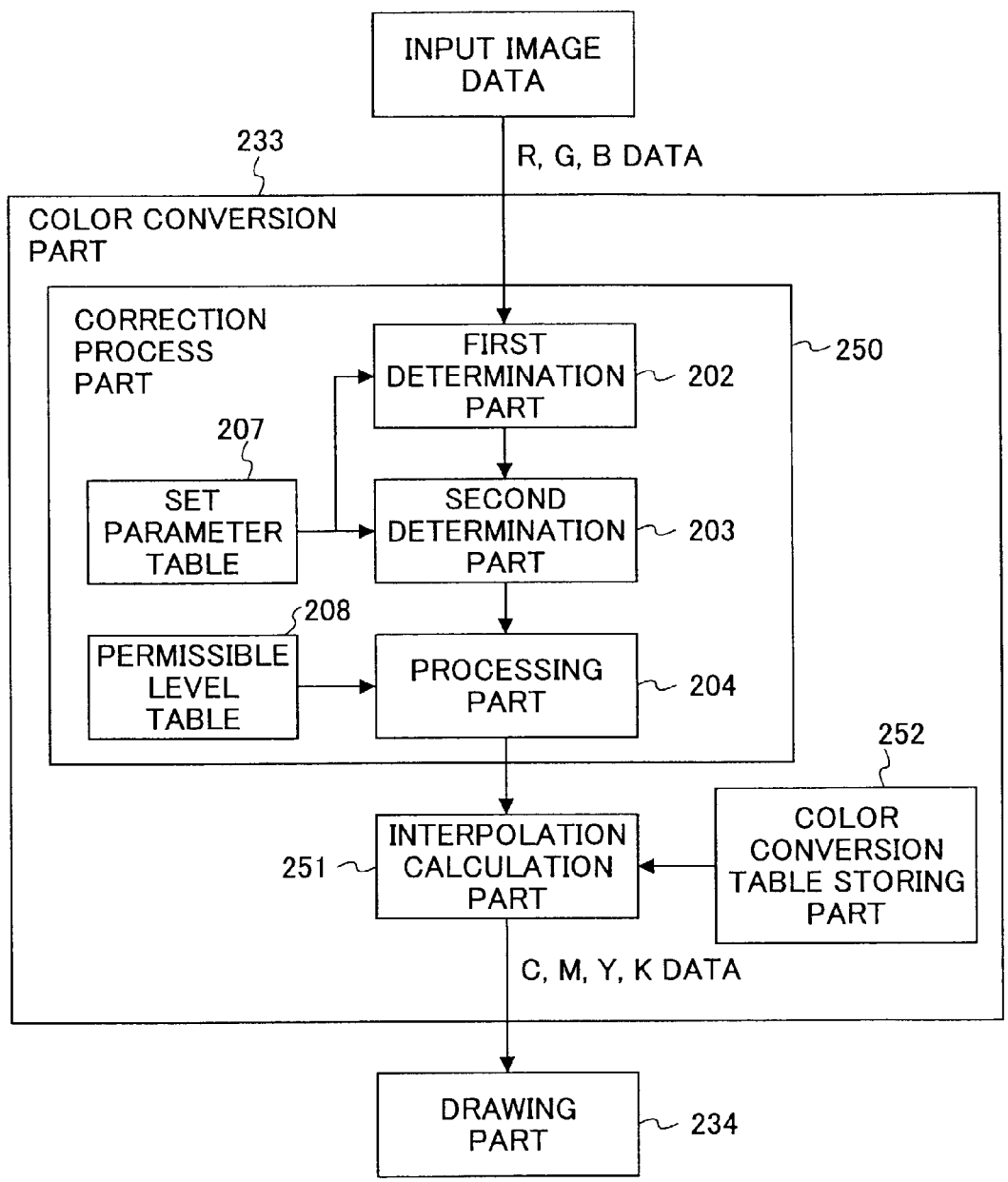
FIG. 32 is a block diagram showing the structure of a color conversion part in FIG. 31.

As shown in FIG. 32, the color conversion part 233 includes a correction process part 250, an interpolation calculation part 251, and a color conversion table storing part 252. The correction process part 250 includes a set parameter table 207 and a permissible level table 208, besides a first determination part 202, a second determination part 203 and a processing part 204 that are similar to those corresponding parts in the image processing apparatus 201 in the third embodiment.

In the following, a description will be given of the process of the image processing apparatus 232a for a case where the personal computer 231a or 231b sends RGB image data to the image processing apparatus 232a, the image data are converted into CMYK print data, and the printer 236a outputs the print data as an image, for example.

When the RGB image data are sent to the image processing apparatus 232a, in the correction process part 250 in the color conversion part 233, the first determination part 202 and the second determination part 203 determine the type of the image. The processing part 204 creates a gradation correction table corresponding to the determined type, and performs the gradation correction using the created table.

Since different printers have different reproducing ranges, each printer has a different permissible range of the destruction of the gradation. Accordingly, the correction process part 250 keeps parameter information relating to the printer (236a, in this case) from which an output will be made as a table. More specifically, the correction process part 250 keeps, in a set parameter table 207, the parameters defining the high-luminance white light pixels in the above-mentioned condition (5) and cumulative frequency parameters in setting the dynamic range. In addition, the permissible level of the destruction of the gradation varies depending on the ink characteristics of the printer and the halftone process of the drawing part 251. For this reason, the correction process part 250 keeps, in the set parameter table, determination threshold values of the degree of saturation (chroma) for permission evaluation of the destruction of the gradation. The first determination part 202 and the second determination part 203 read and use the parameters kept in the set parameter table 207. The processing part 204 reads and uses the parameters kept in the permissible level table 208.

Next, in the color conversion part 233, an optimum table is selected from among the color conversion tables stored in the color conversion table storing part 252, and the selected optimum table is sent to the interpolation calculation part 251. The interpolation calculation part 251 performs a memory map interpolation that is similar to that of the second embodiment on input RGB of a memory map of the selected color conversion table, converts RGB image data into CMYK print data, and sends the CMYK print data to the drawing part 234.

The print data converted into CMYK by the interpolation calculation part 251 are sent to the drawing part 234. Print image data on which the halftone process and the like are performed by the drawing part 234 are temporarily stored in the image storing part 235 page by page, and are finally printed out by the printer 236a.

Of course, the above-described image processing apparatuses 232a and 232b may be realized as separate hardware apparatuses. However, it is also possible for the printer 236a and 236b to include all the functions or the partial functions of the image processing apparatuses 232a and 232b, respectively. In addition, it is also possible for software to include all the functions or the partial functions. For example, printer drivers that operate on the personal computers 231a and 231b may include all the functions or the partial functions of the image processing apparatus. In such a case, among the functions of the interpolation calculation part 251, if the printer drivers include the functions up to (C, Y, K) data generation and the printers include the converting function to (C, M, Y, K) data, the transmission data amount from the personal computer to the printer is reduced, and, generally, there is an advantage in speeding up the process. The present invention also includes programs for such printer drivers and various information recording media (computer-readable recording media), such as the CD-ROM 121 shown in FIG. 16, on which the programs are recorded.

As described in the second embodiment, in a case where print data for one page includes different kinds of objects such as a nature image and a graphic image, it is necessary that the image data are sent to the image processing apparatuses 232a and 232b by attaching the correction coefficient to the header of the image data. Additionally, in a case where the printer driver includes the above-mentioned functions, it is also possible to configure the printer driver to read and use a device profile that is standardized by the ICC (Inter Color Consortium).

The present invention is not limited to the specifically disclosed embodiments, and variations and modifications may be made without departing from the scope of the present invention.

The present application is based on Japanese priority application No. 2001-363785 filed on Nov. 29, 2001, the entire contents of which are hereby incorporated by reference.

What is claimed is:

1. An image processing apparatus, comprising:
    a determination part that determines whether or not an image includes a 2-dimensional area where destruction of gradation due to contrast correction tends to be conspicuous;
    an information obtaining part that obtains information of the 2-dimensional area when said determination part determines that the image includes the 2-dimensional area where the destruction of gradation due to the contrast correction tends to be conspicuous;
    a dynamic range setting part that sets a dynamic range using the information of the 2-dimensional area obtained by said information obtaining part; and
    a processing part that performs the contrast correction on the image using the dynamic range set by said dynamic range setting part.

2. The image processing apparatus as claimed in claim 1, wherein the dynamic range setting part uses color information of the 2-dimensional area at least for setting a highlight point of the dynamic range, said color information being obtained by the information obtaining part.

3. The image processing apparatus as claimed in claim 1, wherein the 2-dimensional area where the destruction of the gradation due to the contrast correction tends to be conspicuous is an image area corresponding to a relatively bright range when the image is described by information representing distribution of brightness.

4. The image processing apparatus as claimed in claim 1, wherein the 2-dimensional area where the destruction of the gradation due to the contrast correction tends to be conspicuous is an image area corresponding to a brightest range when the image is described by information representing distribution of brightness and a distribution range is divided into at least two ranges.

5. The image processing apparatus as claimed in claim 1, wherein the information of the 2-dimensional area obtained by the information obtaining part does not include information of the area having luminance equal to or more than a predetermined value and having chroma equal to or less than a predetermined value.

6. The image processing apparatus as claimed in claim 1, wherein the information of the 2-dimensional area obtained by the information obtaining part does not include information of an image area constituting an edge.

7. The image processing apparatus as claimed in claim 1, wherein the determination part determines a characteristic of the image by histogram analysis.

8. The image processing apparatus as claimed in claim 1, wherein the determination part analyzes header information attached to the image for the determination.

9. The image processing apparatus as claimed in claim 1, wherein a determination result of the determination part is given by an operator.

10. The image processing apparatus as claimed in claim 1, further comprising:
    a detection part that distinguishes a background area from an object area in an image and detects the brightness of each of the background and object areas.

11. An image processing method, comprising:
    (a) determining whether or not an image includes a 2-dimensional area where destruction of gradation due to contrast correction tends to be conspicuous;
    (b) obtaining information of the 2-dimensional area when it is determined, in the step (a), that the image includes the 2-dimensional area where the destruction of gradation due to the contrast correction tends to be conspicuous;
    (c) setting a dynamic range using the information of the 2-dimensional area obtained in the step (b); and
    (d) performing the contrast correction on the image using the dynamic range set in the step (c).

12. The image processing method as claimed in claim 11, further comprising:
    distinguishing a background area from an object area in an image to detect the brightness of each of the background and object areas.

13. The image processing method as claimed in claim 11, wherein, in setting a dynamic range, the color information of the 2-dimensional area is used at least for setting a highlight point of the dynamic range, the color information being obtained as a part of the information of the 2-dimensional area.

14. A computer-readable storage medium that stores a program for causing a computer to carry out an imaging process comprising the procedures of:
    (a) causing the computer to determine whether or not an image includes a 2-dimensional area where destruction of gradation due to contrast correction tends to be conspicuous;
    (b) causing the computer to obtain information of the 2-dimensional area when it is determined, in the procedure (a), that the image includes the 2-dimensional area where destruction of gradation due to contrast correction tends to be conspicuous;
    (c) causing the computer to set a dynamic range using the information of the 2-dimensional area obtained in the procedure (b); and
    (d) causing the computer to perform the contrast correction on the image using the dynamic range set in the procedure (c).

15. An image processing apparatus, comprising:
    a determination part that determines whether or not an image includes a 2-dimensional area where destruction of gradation due to contrast correction tends to be conspicuous; and
    an information obtaining part that obtains information of the 2-dimensional area when said determination part determines that the image includes the 2-dimensional area where the destruction of gradation due to the contrast correction tends to be conspicuous,
    wherein the information of the 2-dimensional area obtained by the information obtaining art does not include information of the 2-dimensional area having chroma equal to or less than a predetermined value.

16. The image processing apparatus as claimed in claim 15, wherein the information of the 2-dimensional area obtained by the information obtaining part further does not include information of the 2-dimensional area having luminance equal to or more than predetermined value.

17. The image processing apparatus as claimed in claim 16, further comprising:
    a dynamic range setting part that sets a dynamic range using the information of the 2-dimensional area obtained by said information obtaining part; and a processing part that performs the contrast correction on the image using the dynamic range set by said dynamic range setting part.

18. An image processing apparatus, comprising:
a determination part that determines whether or not an image includes a 2-dimensional area where destruction of gradation due to contrast correction tends to be conspicuous; and
an information obtaining part that obtains information of the 2-dimensional area when said determination part determines that the image includes the 2-dimensional area where the destruction of gradation due to the contrast correction tends to be conspicuous,
wherein the information of the two-dimensional area obtained by the information obtaining part does not include information of an image area constituting an edge.

* * * * *